US010581748B2

(12) United States Patent
Matsuo et al.

(10) Patent No.: US 10,581,748 B2
(45) Date of Patent: Mar. 3, 2020

(54) INFORMATION PROCESSING APPARATUS, INFORMATION PROCESSING METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Yuki Matsuo, Bunkyo (JP); Munenori Maeda, Yokohama (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/954,960

(22) Filed: Apr. 17, 2018

(65) Prior Publication Data

US 2018/0309687 A1 Oct. 25, 2018

(30) Foreign Application Priority Data

Apr. 19, 2017 (JP) ................................ 2017-082661

(51) Int. Cl.
*H04L 12/825* (2013.01)
*H04L 12/861* (2013.01)

(52) U.S. Cl.
CPC .............. *H04L 47/26* (2013.01); *H04L 49/90* (2013.01)

(58) Field of Classification Search
CPC ................................ H04L 47/26; H04L 49/90
See application file for complete search history.

(56) References Cited

U.S. PATENT DOCUMENTS 7,325,497 B2 * 2/2008 Ben-Ezra .................. B07C 5/36 104/88.01
2003/0088610 A1 * 5/2003 Kohn .................... G06F 1/3203 718/107
2004/0049774 A1 3/2004 Boyd et al.
2004/0199571 A1 * 10/2004 Spiegl ................. H04L 41/5012 709/201
2004/0246956 A1 * 12/2004 Meng ...................... H04L 49/90 370/389

(Continued)

FOREIGN PATENT DOCUMENTS

JP 2005-538588 12/2005
JP 2015-216450 12/2015

*Primary Examiner* — Ivan O Latorre
(74) *Attorney, Agent, or Firm* — Fujitsu Patent Center

(57) ABSTRACT

An information processing apparatus including a communication interface to communicate with another information processing apparatus, and a processor that executes a process including issuing, by a first thread, a reception request of data from the another information processing apparatus to the communication interface, determining, by using the first thread, whether a completion notification is stored in a queue that stores data transmitted from the other information processing apparatus, causing the first thread to transit to a suspended state when the completion notification is not stored, executing a processing by using a second thread included in the plurality of threads when the first thread is in the suspended state, determining whether the completion notification is stored in the queue after the processing, and transferring the received data to the first thread and causing the first thread to return from the suspended state, upon a storing of the completion notification.

6 Claims, 23 Drawing Sheets

(56) References Cited

U.S. PATENT DOCUMENTS

2005/0240752 A1* 10/2005 Yokoi .................. G06F 9/3851 712/1
2006/0026594 A1* 2/2006 Yoshida ................ G06F 9/3824 718/100
2006/0059287 A1* 3/2006 Rivard .................. G06F 9/4411 710/300
2010/0281483 A1* 11/2010 Rakib .................. G06F 9/3009 718/102
2011/0185209 A1* 7/2011 Shimotono ........... G06F 1/3203 713/323
2013/0298133 A1* 11/2013 Jones ..................... G06F 9/522 718/104
2015/0326661 A1 11/2015 Nakamura et al.
2016/0125018 A1* 5/2016 Tomoda .............. G06F 16/2358 707/703
2017/0011544 A1* 1/2017 Clohset ..................... G06T 1/60
2017/0192790 A1* 7/2017 Robertson ............. G06F 9/3836
2018/0307520 A1* 10/2018 Hyoudou ............ G06F 9/45558

* cited by examiner

2
INFORMATION PROCESSING APPARATUS
1
INFORMATION PROCESSING APPARATUS
1a
COMMUNICATION INTERFACE
1b
CONTROL UNIT
RECEIVED REQUEST
S1
FIRST PROCESSING
SUSPEND
11
THREAD
12
THREAD
13
THREAD
1c
S2
SECOND PROCESSING
S2a
SELECTION PROCESSING
S2b
CHECK PROCESSING
1d
BUFER
DATA
10

520
NODE
523
APPLICATION
POLLING
522
QP (RQ)
WQE
WQE
WQE
524
CQE
CQE
CQ
521
HCA
TRANSMIT DATA
510
NODE
511
HCA
512
QP (SQ)
WQE
WQE
WQE
514
CQE
CQE
CQ
513
APPLICATION
POLLING

520
NODE
525a
525b
525c
525d
THREAD
THREAD
THREAD
THREAD
526a
526b
526c
526d
QP/CQ
QP/CQ
QP/CQ
QP/CQ
531a
531b
531c
531d
510
NODE
516a
516b
516c
516d
QP/CQ
QP/CQ
QP/CQ
QP/CQ
THREAD
THREAD
THREAD
THREAD
515a
515b
515c
515d 100-2
NODE
525a
525b
525c
525d
THREAD
THREAD
THREAD
THREAD
111a-2
QP/CQ
XID=ISSUE-SOURCE NODE NUMBER+SEQUENTIAL NUMBER
100-1
NODE
111a-1
QP/CQ
THREAD
THREAD
THREAD
THREAD
515a
515b
515c
515d

THREAD #15 (NODE 100-1)
THREAD #25 (NODE 100-2)
S121
RECEIVE WRITE DATA
S122
ANALYZE WRITE ADDRESS
S123
TRANSMIT WRITE DATA TO SERVING NODE
S124
RECEIVE WRITE DATA
S125
WRITE TO CACHE
S126
TRANSMIT COMPLETION NOTIFICATION
S127
RECEIVE COMPLETION NOTIFICATION
S128
WAIT TO RECEIVE NEXT WRITE DATA

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-82661, filed on Apr. 19, 2017, the entire contents of which are incorporated herein by reference.

FIELD

The embodiments discussed herein are related to an information processing apparatus, an information processing method, and a non-transitory computer-readable storage medium.

BACKGROUND

InfiniBand (registered trademark) is known as a standard of a bus for communicating between apparatuses. In communication using InfiniBand, a queue, in which a completion notification indicating that a requested communication processing has been completed is stored, is used in each of a transmitting-side apparatus and a receiving-side apparatus. This queue is called a completion queue (CQ). For example, a thread executed on the receiving-side apparatus performs polling for the CQ in order to check whether the reception of data is completed. In a case where the receiving-side apparatus receives the data, the completion notification is stored in the CQ. In a case where the thread has acquired the completion notification from the CQ by polling, the thread recognizes that the reception of the data is completed.

As an example of a technique relating to InfiniBand, there has been proposed an information processing apparatus that determines whether a queue pair (QP) number is added to a received message and enhances check efficiency by checking the QP number only in a case where the QP number is added to the received message.

As an example of a technique relating to a network interface, a queue pair shared by each of a main network interface controller (NIC) corresponding to a remote direct memory access (RDMA) and an alternative NIC is generated, and in response to the detection of a switchover event, there is proposed a method of switching the handling of the queue pair from the main NIC to the alternative NIC.

Japanese Laid-open Patent Publication No. 2015-216450 and Japanese National Publication of International Patent Application No. 2005-538588 are examples of the related art.

SUMMARY

According to an aspect of the invention, an information processing apparatus including a communication interface to communicate with another information processing apparatus, and a processor that executes a process, the process including issuing, by a first thread included in a plurality of threads, a reception request of data from the another information processing apparatus to the communication interface, determining, by using the first thread, whether a completion notification indicating that received data corresponding to the reception request has been received is stored in a queue that stores data transmitted from the other information processing apparatus, causing the first thread to transit to a suspended state when the completion notification is not stored, executing a processing by using a second thread included in the plurality of threads when the first thread is in the suspended state, determining whether the completion notification is stored in the queue after the processing, and transferring the received data to the first thread and causing the first thread to return from the suspended state, upon a storing of the completion notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the receiving-side apparatus of InfiniBand, there is a case that, depending on the processing load of the apparatus and the load of transmission path, a delay time, after the thread starts polling for the CQ and until the completion notification is stored in the CQ, become longer. In that case, the thread is suspended after polling for the CQ a certain number of times, and then is wake-up by the thread scheduler and performs polling for the CQ again. As the delay time become longer, the waking-up and suspending of the thread for performing polling are repeatedly executed. Since, in a case of waking-up or suspending the thread, a context switching with a high processing load is generated, a processing load for checking whether the reception is completed may increase as the delay time increases.

In one aspect, an object of the embodiments is to provide an information processing apparatus, an information processing method, and an information processing program capable of reducing the processing load for checking whether the reception of data is completed.

In one aspect, it is possible to reduce the processing load for checking whether the reception of data is completed.

Hereinafter, the embodiments is described with reference to the drawings.

First Embodiment

Figure 1:
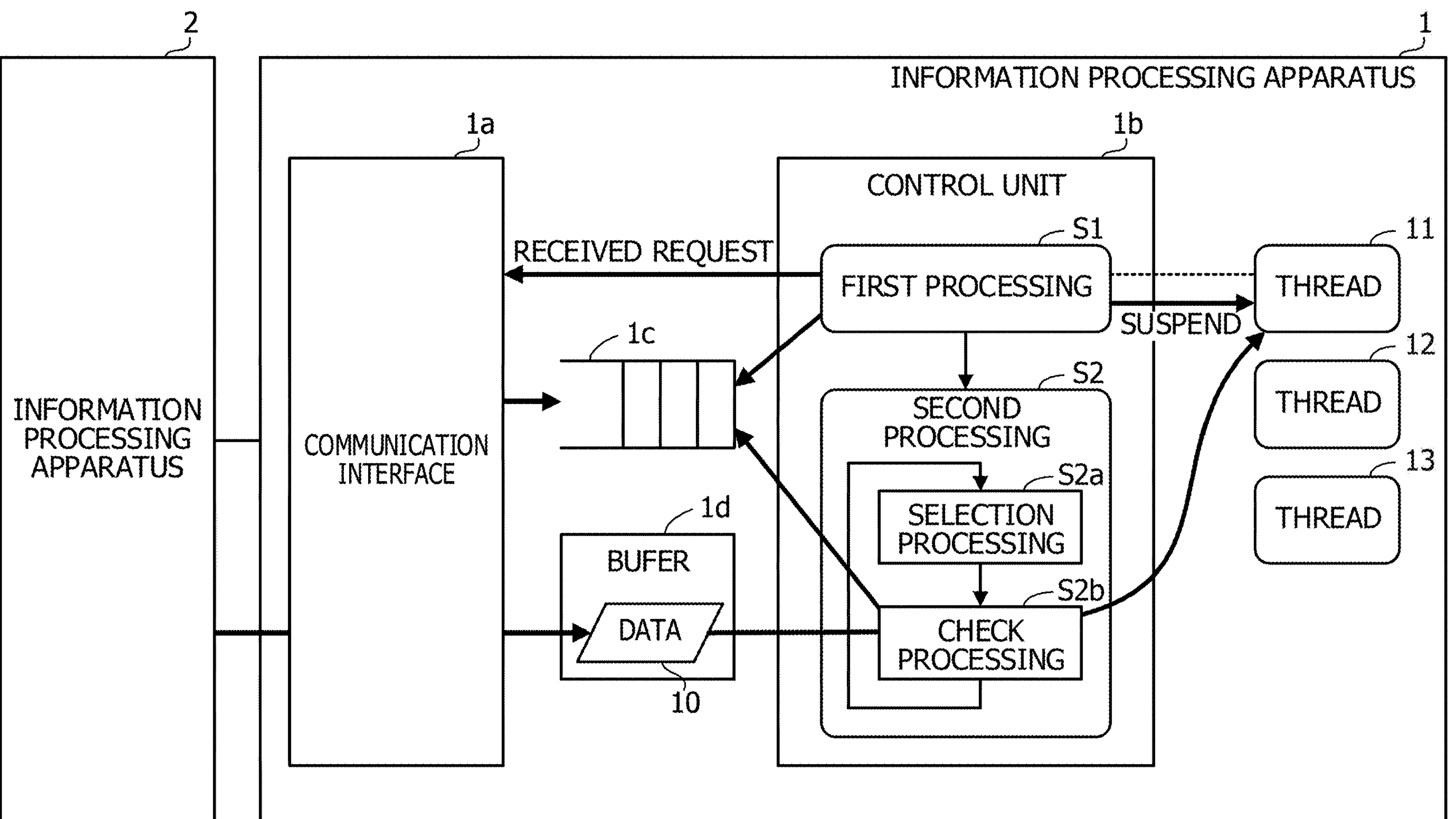
FIG. 1 is a diagram illustrating a configuration example and a processing example of an information processing system according to a first embodiment.

FIG. 1 is a diagram illustrating a configuration example and a processing example of an information processing system according to a first embodiment. The information processing system illustrated in FIG. 1 includes information processing apparatuses 1 and 2. The information processing apparatuses 1 and 2 are connected by, for example, using InfiniBand. The information processing apparatuses 1 and 2 may communicate to each other.

The information processing apparatus 1 includes a communication interface 1*a* and a control unit 1*b*. The communication interface 1*a* communicates with the information processing apparatus 2. The control unit 1*b* is implemented, for example, as a processor provided on the information processing apparatus 1.

The control unit 1*b* executes the threads 11 to 13. Processing of each of the threads 11 to 13 includes the reception processing of data from the information processing apparatus 2. Here, the reception processing of data in the information processing apparatus 1 is basically performed in the following procedures.

The control unit 1*b* issues a received request of data to the communication interface 1*a* and enters a state of waiting for reception. In a case where the communication interface 1*a* receives the data from the information processing apparatus 2, the completion notification indicating that the reception processing corresponding to the issued received request has been completed is registered in a queue 1*c*. The queue 1*c* holds the completion notification using a first in first out (FIFO) method. The received data, for example, is temporarily stored in a buffer 1*d*.

After the control unit 1*b* issues the received request, the control unit 1*b* checks whether the completion notification corresponding to the received request is stored in the queue 1*c*. In a case where the control unit 1*b* detects that the completion notification has been stored in the queue 1*c*, that is, in a case where the completion notification may be acquired from the queue 1*c*, the control unit 1*b* recognizes that the reception processing has been completed, and acquires the received data stored in the buffer 1*d*.

According to the processing procedure, in a case where the delay time after the received request issues and until the completion notification is stored in the queue 1*c* is long, the control unit 1*b* checks the queue 1*c* several times until the completion notification may be acquired. Here, for example, in the case where the control unit 1*b* issues a received request by executing the thread 11, it is considered that the check of the queue 1*c* is repeated until a corresponding completion notification may be acquired from the queue 1*c* by the processing of the thread 11. Since one thread 11 may not monopolize the control unit 1*b* for a long time, in the above case, in the case where the completion notification may not be acquired even though the queue 1*c* is checked several times by execution of the thread 11, the control unit 1*b* suspends the thread 11 and starts execution of another thread. Thereafter, the control unit 1*b* returns the thread 11 from a suspended state and executes the thread 11 to execute the check of the queue 1*c* again. However, in a case where the completion notification may not be acquired, the control unit 1*b* causes the thread 11 to be suspended again and starts execution of another thread.

In this manner, in the above case, in a case where it is considered that check of the queue 1*c* is performed only by the processing of the thread 11, and the delay time after the received request by the thread 11 is issued and until the completion notification is stored in the queue 1*c* is long, the thread 11 is repeatedly suspended and returned several times. In a case of suspending or restoring the thread 11, a context switching with a high processing load is generated. Therefore, as the delay time becomes longer, the processing load of the control unit 1*b* for checking whether the reception is completed increases.

In relation to the problems, in this embodiment, the control unit 1*b* reduces the number of suspended and returned times of threads by enabling check execution of the queue 1*c* while suspending the thread, and controls the processing load. Hereinafter, specific processing of the control unit 1*b* is described.

The control unit 1*b* executes the following a first processing (step S1). Herein, as an example, it is considered that the received request is issued by execution of the thread 11. By execution of the thread 11, the control unit 1*b* issues a received request to the communication interface 1*a*. Thereafter, the control unit 1*b* checks whether the completion notification indicating the completion of the reception processing according to the issued received request is stored in the queue 1*c*. This check processing, for example, is executed with a certain number of times as an upper limit. Here, in a case where it may not be detected that a corresponding completion notification has been stored in the queue 1*c*, the control unit 1*b* causes the thread 11 to transitions to the suspended state.

The control unit 1*b* performs a second processing (step S2) of alternatively executing a selection processing (step S2*a*) for selecting a thread to be executed next from among the threads 12 and 13, of the threads 11 to 13, which are not in the suspended state, and a check processing (step S2*b*) of the queue 1*c*. In the second processing, the control unit 1*b* operates as a thread scheduler by repeatedly executing the selection processing of a thread to be executed.

Here, it is considered that the data 10 corresponding to the received request issued in step S1 is received by the communication interface 1*a* at a certain timing while the selection processing and the check processing are repeatedly executed, and the data 10 is stored in the buffer 1*d*. In this case, the control unit 1*b* detects that the completion notification indicating the completion of the reception processing according to the received request issued in the step S1 is stored in the queue 1*c*, by the check processing (step S2*b*) of the queue 1*c* executed after the reception of the data 10. Then, the control unit 1*b* transfers the received data 10 to the thread 11. The control unit 1*b* returns the thread 11 from the suspended state and returns the thread 11 to the target of selection processing.

According to the above processing, in a case where the control unit 1*b* may not detect that the completion notification has been stored in the queue 1*c* by the check processing in step S1 by the execution of the thread 11, the control unit 1*b* causes the thread 11 to enter a suspended state. Thereafter, the control unit 1*b* periodically checks the queue 1*c* while keeping the thread 11 suspended. In a case where the control unit 1*b* detects that the completion notification is stored in the queue 1*c*, the control unit 1*b* transfers the received data 10 to the thread 11 and returns the thread 11.

As a result, after the thread 11 is suspended once, the thread 11 does not return to check the queue 1*c*, but the thread 11 returns to that a corresponding completion notification is detected from the queue 1*c* by execution of the second processing (step S2). Therefore, the thread 11 does not be repeatedly suspended and returned, and the processing load of the control unit 1*b* for checking whether the reception of the data is completed may be reduced. As a result, the load of the entire data reception processing by the information processing apparatus 1 may be reduced, and the efficiency of the data reception processing may be improved more.

Second Embodiment

Figure 2:
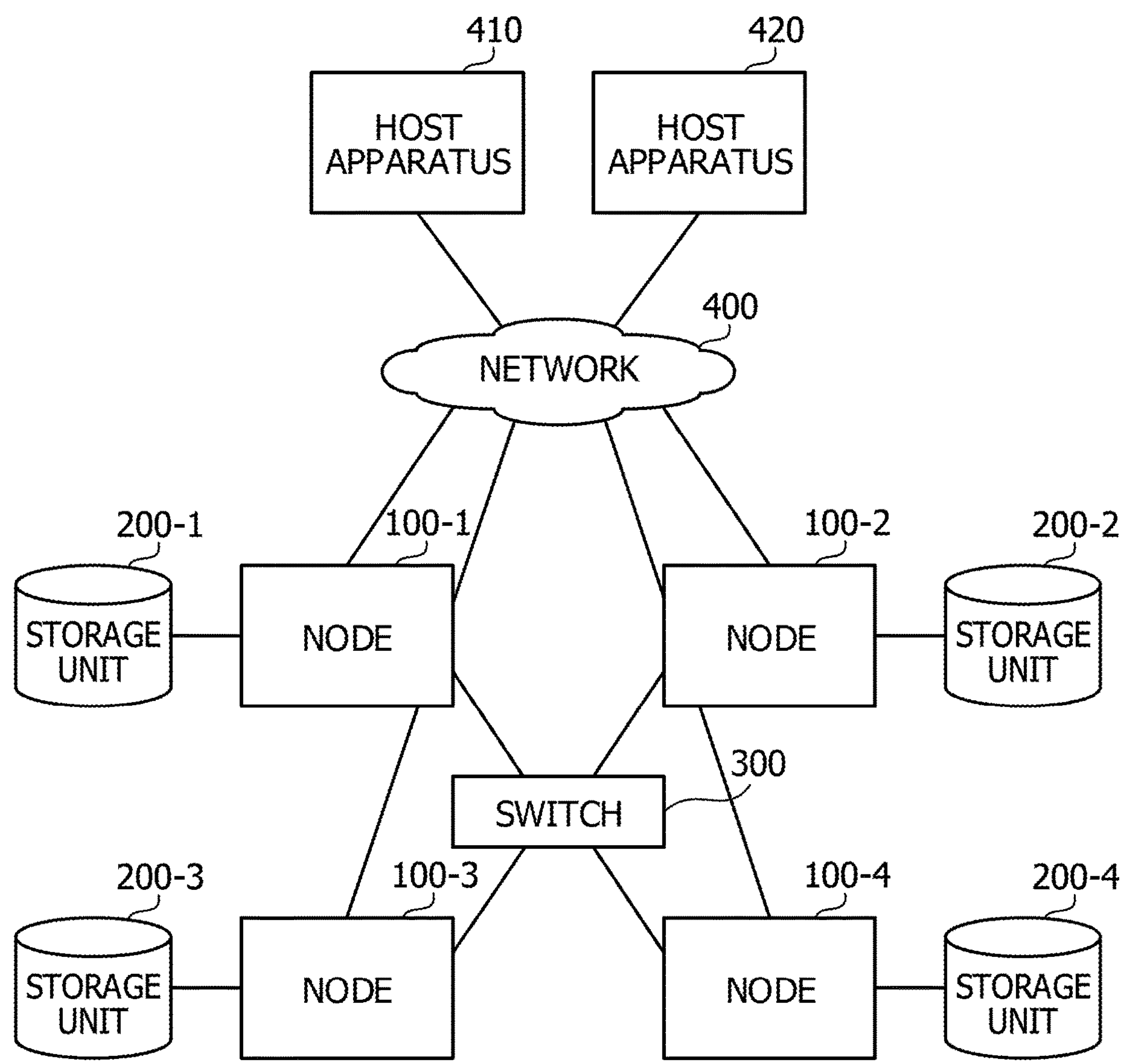
FIG. 2 is a diagram illustrating a configuration example of a storage system according to a second embodiment.

FIG. 2 is a diagram illustrating a configuration example of the storage system according to the second embodiment. The storage system illustrated in FIG. 2 includes nodes 100-1 to 100-4. Storage units 200-1, 200-2, 200-3, and 200-4 are connected to nodes 100-1, 100-2, 100-3, and 100-4, respectively. Nodes 100-1, 100-2, 100-3, and 100-4 operate as storage controllers for controlling access to the storage units 200-1, 200-2, 200-3 and 200-4, respectively.

One or a plurality of nonvolatile storage devices are mounted on each of the storage units 200-1 to 200-4. The nonvolatile storage device, for example, is a solid state drive (SSD) or a hard disk drive (HDD). The node 100-1 and the storage unit 200-1, the node 100-2 and the storage unit 200-2, the node 100-3 and the storage unit 200-3, and the node 100-4 and the storage unit 200-4, respectively form a storage node. The number of storage nodes included in the storage system is not limited to four nodes as illustrated in FIG. 2 and may be a certain number of two or more.

The nodes 100-1 to 100-4 are connected with one another via a switch 300. In this embodiment, the nodes 100-1 to 100-4 are connected with one another using InfiniBand. The nodes 100-1 to 100-4 are connected to host apparatuses 410 and 420 via a network 400. The nodes 100-1 to 100-4, and the host apparatuses 410 and 420 are connected through, for example, a Storage Area Network (SAN) using a Serial Attached SCSI (Small Computer System Interface) (SAS) or a fibre channel (FC).

This storage system operates, for example, as a distributed storage system in which data requested to be written from the host apparatuses 410 and 420 are distributed and stored. For example, storage access control is executed as follows.

The storage system provides a plurality of logical volumes to the host apparatuses 410 and 420. In a case where a certain logical volume is accessed, the host apparatuses 410 and 420 transmit an Input/Output (IO) request to any one of the nodes 100-1 to 100-4. For each range of a write address in the logical volume, a serving node for storing data is determined in advance.

For example, it is considered that a certain node receives a write request as an IO request. The node, which has received the write request, analyzes the write address, determines the serving node from among the nodes 100-1 to 100-4, and transmits write data to the serving node. After the serving node temporarily stores the transmitted write data in a cache, the serving node at an asynchronous timing stores the write data in a storage unit connected to the serving node.

For example, the serving node may be determined based on the hash value of the write data. In this case, the serving node also may perform "duplication elimination" to control so that data of the same content is not stored in the storage in duplication, based on the hash value of the write data.

The number of host apparatuses that may be connected to the storage system is not limited to two as illustrated in FIG. 2.

Figure 3:
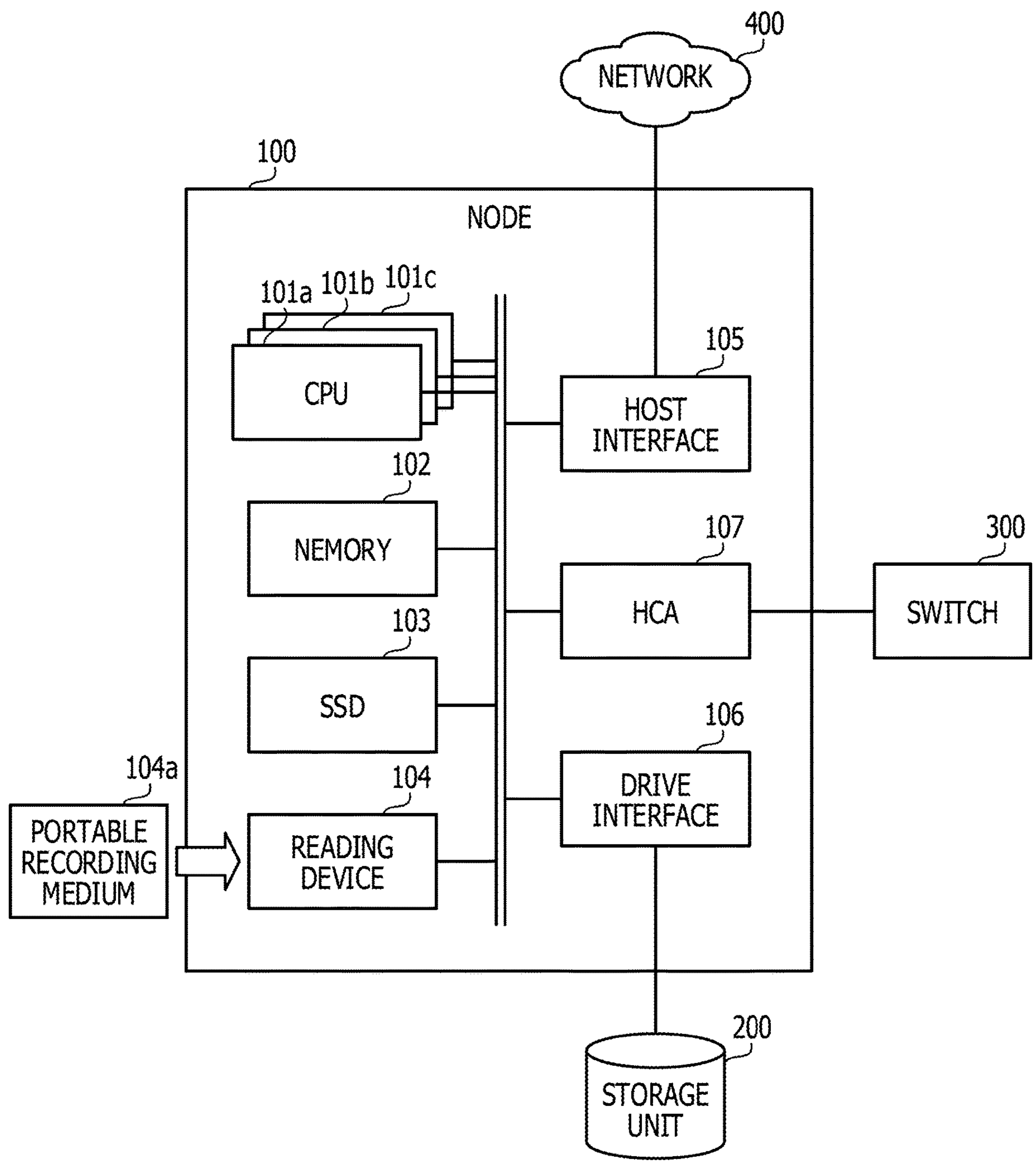
FIG. 3 is a diagram illustrating an example of a hardware configuration of a node.

FIG. 3 is a diagram illustrating an example of a hardware configuration of a node. The node 100 as illustrated in FIG. 3 indicates any one of the nodes 100-1 to 100-4 as illustrated in FIG. 2. In the following description, in the case where each of the nodes 100-1 to 100-4 is indicated without especially differentiating between the nodes, the nodes may be described as "node 100".

The node 100 is implemented, for example, as a computer as illustrated in FIG. 3. The node 100 has central processing units (CPUs) 101*a* to 101*c*, a memory 102, an SSD 103, a reading device 104, a host interface 105, a drive interface 106, and a host channel adapter (HCA) 107.

The CPUs 101*a* to 101*c* totally control the entire node 100. The number of CPUs is not limited to three. The memory 102 is a volatile storage device such as a dynamic random access memory (DRAM), and is used as a main storage device of the node 100. In the memory 102, there is temporarily stored at least a part of an operating system (OS) program and an application program to be executed by the CPUs 101*a* to 101*c*. In the memory 102, there are stored various data desirable for processing by the CPUs 101*a* to 101*c*.

The SSD 103 is used as an auxiliary storage device of the node 100. In the SSD 103, there are stored OS programs, application programs, and various data. As the auxiliary storage device, another type of nonvolatile storage device such as an HDD may be used. A portable recording medium 104*a* is attached and detached to the reading device 104. The reading device 104 reads data recorded on the portable recording medium 104*a* and transmits the data to the CPUs 101*a* to 101*c*. Examples of the portable recording medium 104*a* include an optical disk, a magneto-optical disk, a semiconductor memory, and the like.

The host interface 105 is an interface device for communicating with the host apparatuses 410 and 420 via the network 400. The drive interface 106 is an interface device for communicating with a storage unit 200. The HCA 107 is an interface device in compliance with InfiniBand, for communicating with another node 100 via the switch 300.

With the above hardware configuration, the processing function of the node 100 (the nodes 100-1 to 100-4) may be implemented. The host apparatuses 410 and 420 may also be implemented as a computer having a CPU, a memory and the like, similarly to the node 100.

Allocation of Queue to Threads

Next, allocation of a queue used for communication between nodes with respect to a thread executed on a node is described. Herein, firstly, with reference to FIGS. 4 and 5, a comparative example of inter-node communication using InfiniBand is described, and then inter-node communication according to this embodiment is described.

Figure 4:
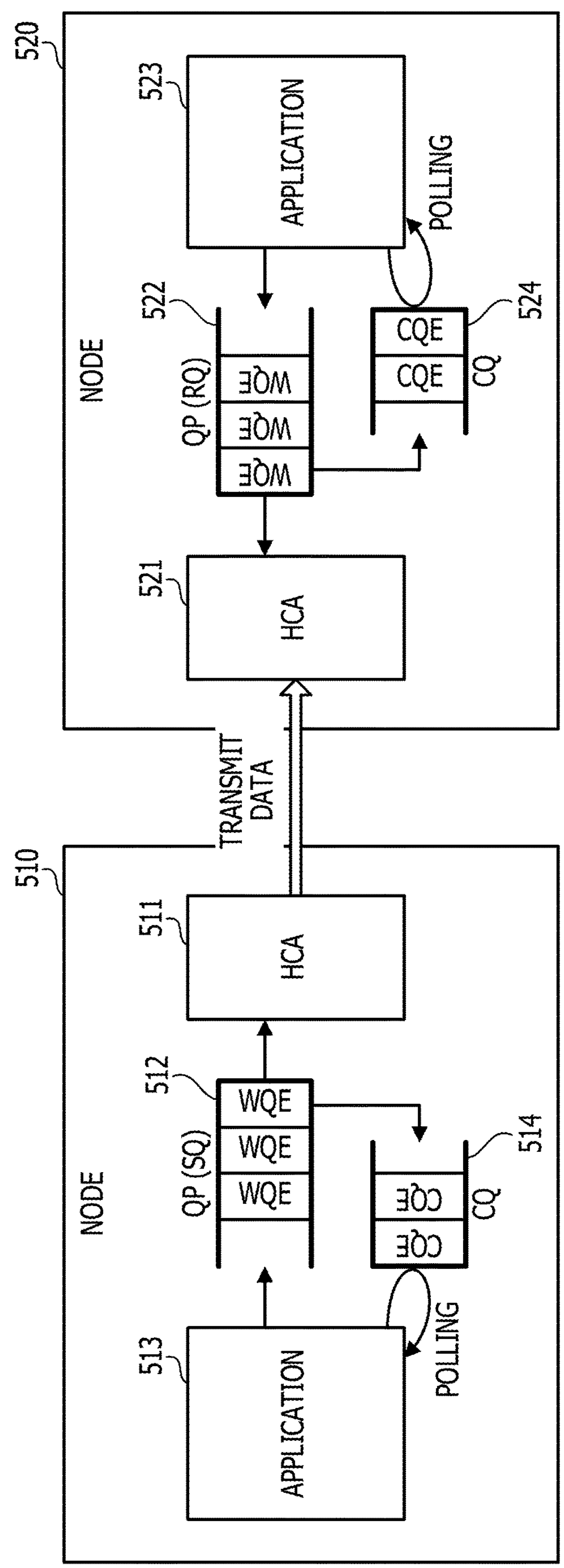
FIG. 4 is a diagram for explaining a basic communication processing procedure between a transmitting-side node and a receiving-side node.

FIG. 4 is a diagram for explaining a basic communication processing procedure between the transmitting-side node and the receiving-side node. FIG. 4 illustrates the node 510 having the HCA 511 and the node 520 having the HCA 521, and there is described a case where data is transmitted from the node 510 to the node 520 via InfiniBand.

In InfiniBand, communication is performed using a transmission QP 512 and a reception QP 522. The transmission QP 512 is a FIFO in which an entry indicating a transmission request is stored, and the transmission QP 512 is also called a "send queue (SQ)". The entry stored in the QP 512 includes, for example, the address of a transmit buffer, and the like in which a transmitted message is stored. The reception QP 522 is a FIFO in which an entry indicating a received request is stored, and the reception QP 522 is also called a "receive queue (RQ)". The entry stored in the QP 522 includes, for example, the address of a receive buffer, and the like in which a received message is stored.

At the transmitting-side node 510, an application 513 issues a send function "send" (for example, ibv_post_send ( )) in a case where a message is transmitted. Then, the entry indicating the transmission request is stored in the QP 512, and the transmitted message is set in a transmit buffer indicated by an address designated as an argument. The entry stored in the QP 512 is called a work queue element (WQE). The HCA 511 transmits the transmitted message based on the entry acquired from the QP 512.

InfiniBand uses the CQ in addition to the QP. The CQ is a FIFO in which an entry indicating completion is stored. The entry stored in the CQ is called a completion queue entry (CQE). The content of "Completion" indicated by this entry includes "Successful Completion" indicating that a processing corresponding to the QP entry has been completed successfully and "Completion Error" indicating that the processing is ended with an error.

In a case where message transmission processing by the HCA 511 is completed, an entry indicating completion is stored in the CQ 514. The application 513 performs polling for the CQ 514 after issuing the send function "send", thereby acquiring an entry indicating the completion of a processing corresponding to the transmission request from the CQ 514.

On the other hand, at the receiving-side node 520, an application 523 issues a receive function "recv" (for example, ibv_post_recv ( )) in a case where a message is received. Then, an entry indicating the received request is stored in the QP 522. The HCA 521 receives a message based on the entry acquired from the QP 522 and sets the received message in a receive buffer indicated by an address included in the entry. In a case where a message reception processing by the HCA 521 is completed, an entry indicating completion is stored in the CQ 524. The application 523 performs polling for the CQ 524 after issuing the receive function "recv", thereby acquiring an entry indicating the completion of a processing corresponding to the received request from the CQ 524. The application 523 acquires the received message from the receive buffer indicated by an address included in the acquired entry.

In this manner, in a case where communicating through InfiniBand, the applications request transmission or reception of a message and then polls for the CQ to detect that the requested processing is completed.

Figure 5:
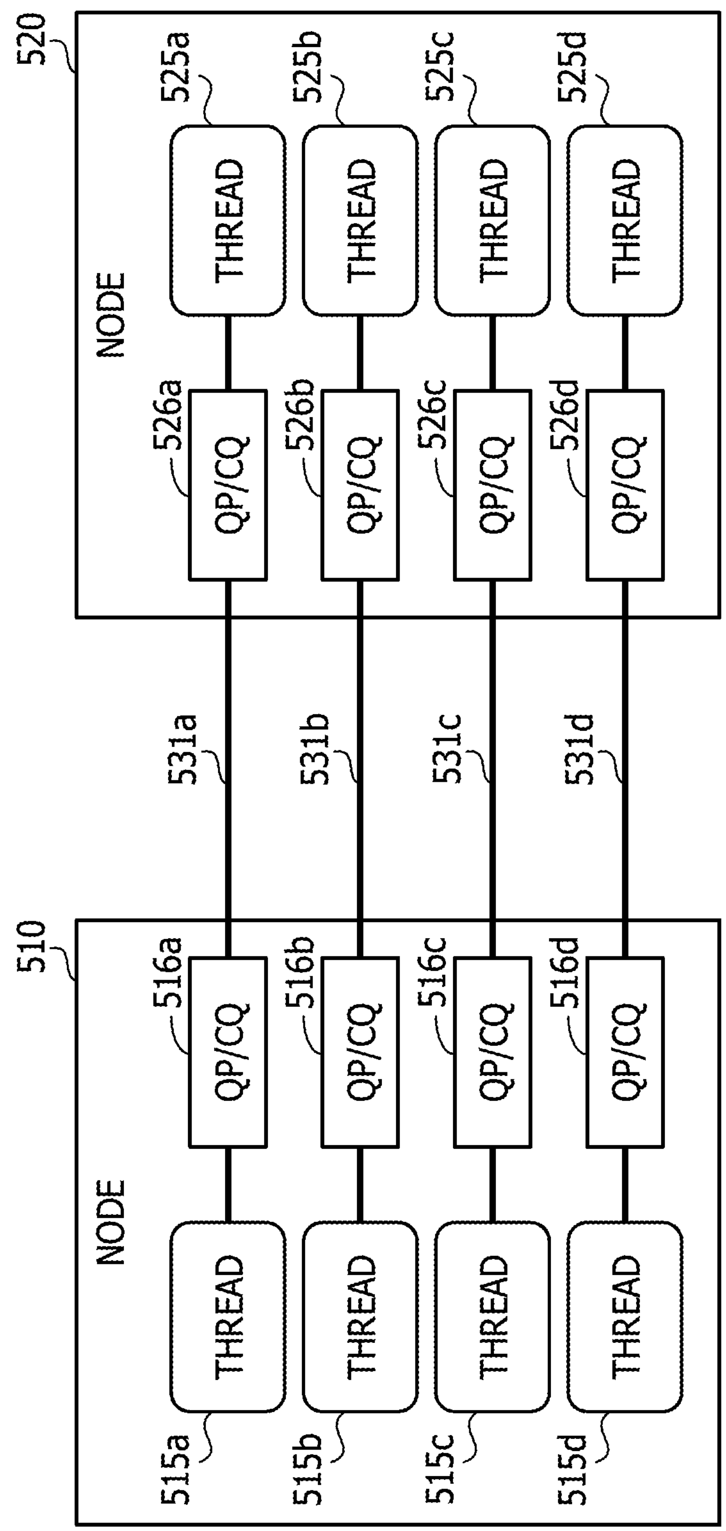
FIG. 5 is a diagram illustrating a comparative example of communication processing between a plurality of threads.

FIG. 5 is a diagram illustrating a comparative example of communication processing between a plurality of threads. Hereinafter, it is considered that a "QP/CQ" includes a transmission QP and a CQ corresponding thereto, and a reception QP and a CQ corresponding thereto. However, the CQ may be shared by the transmission QP and the reception QP.

Herein, it is considered that communication is performed between one specific thread executed on a certain node and one specific thread executed on a node other than the certain node. In this case, there is provided a method of establishing a connection which is a logical communication path between one thread of one node and one thread of the other node, and allocating individual QP/CQs for respective connections, which is the simplest method. The reason is that, according to this method, each thread may easily acquire an entry addressed to the thread itself only by polling the allocated CQ after performing transmission or received requests.

For example, in FIG. 5, threads 515*a* to 515*d* are executed on the node 510 and threads 525*a* to 525*d* are executed on node 520. Communication is performed between the thread 515*a* and the thread 525*a*, between the thread 515*b* and the thread 525*b*, between the thread 515*c* and the thread 525*c*, and between the thread 515*d* and the thread 525*d*, respectively.

In this case, for the connection 531*a* between the thread 515*a* and the thread 525*a*, the QP/CQ 516*a* is allocated to the thread 515*a* and the QP/CQ 526*a* is allocated to the thread 525*a*. Similarly, for the connection 531*b* between the thread 515*b* and the thread 525*b*, the QP/CQ 516*b* is allocated to the thread 515*b* and the QP/CQ 526*b* is allocated to the thread 525*b*. For the connection 531*c* between the thread 515*c* and the thread 525*c*, the QP/CQ 516*c* is allocated to the thread 515*c* and QP/CQ 526*c* is allocated to the thread 525*c*. Furthermore, for the connection 531*d* between the thread 515*d* and the thread 525*d*, the QP/CQ 516*d* is allocated to the thread 515*d* and the QP/CQ 526*d* is allocated to the thread 525*d*.

With such a configuration, for example, only the entry addressed to the thread 525*a* is stored in the CQ of the QP/CQ 526*a*. Therefore, after requesting the reception of a message, the thread 525*a* may easily acquire the entry of completion corresponding to a reception request only by monitoring the CQ of the QP/CQ 526*a*.

However, in such a configuration, there are the following problems in a case where the number of connections established between threads increases.

Connections 531*a* to 531*d* established between threads exist on a common physical communication path. Therefore, as the number of established connections increases, there is a possibility that a delay time after a thread requests transmission or reception and until the entry of completion corresponding to the request may be acquired from the CQ becomes longer.

In a case where there is a difference in the number of communication connections among connections 531*a* to 531*d*, with respect to a CQ corresponding to a thread with frequent communication, the number of entries stored in the CQ per unit time increases, even if the above delay time becomes longer. Therefore, as there is a thread on a connection with frequent communication, there is a high probability that the thread on the connection with the frequent communication may acquire the entry of completion in a case where the thread polls for the CQ. However, on the other hand, as there is a thread on a connection with a low frequency of communication connections, there is a low probability that the thread on the connection with a low frequency of communication connections f may acquire the entry of completion in a case where the thread polls for the CQ. As described above, there is a problem that a thread on the connection with a low frequency of communication connections performs a lot of unnecessary polling so that resources such as a CPU and a memory are wasted.

Figure 6:
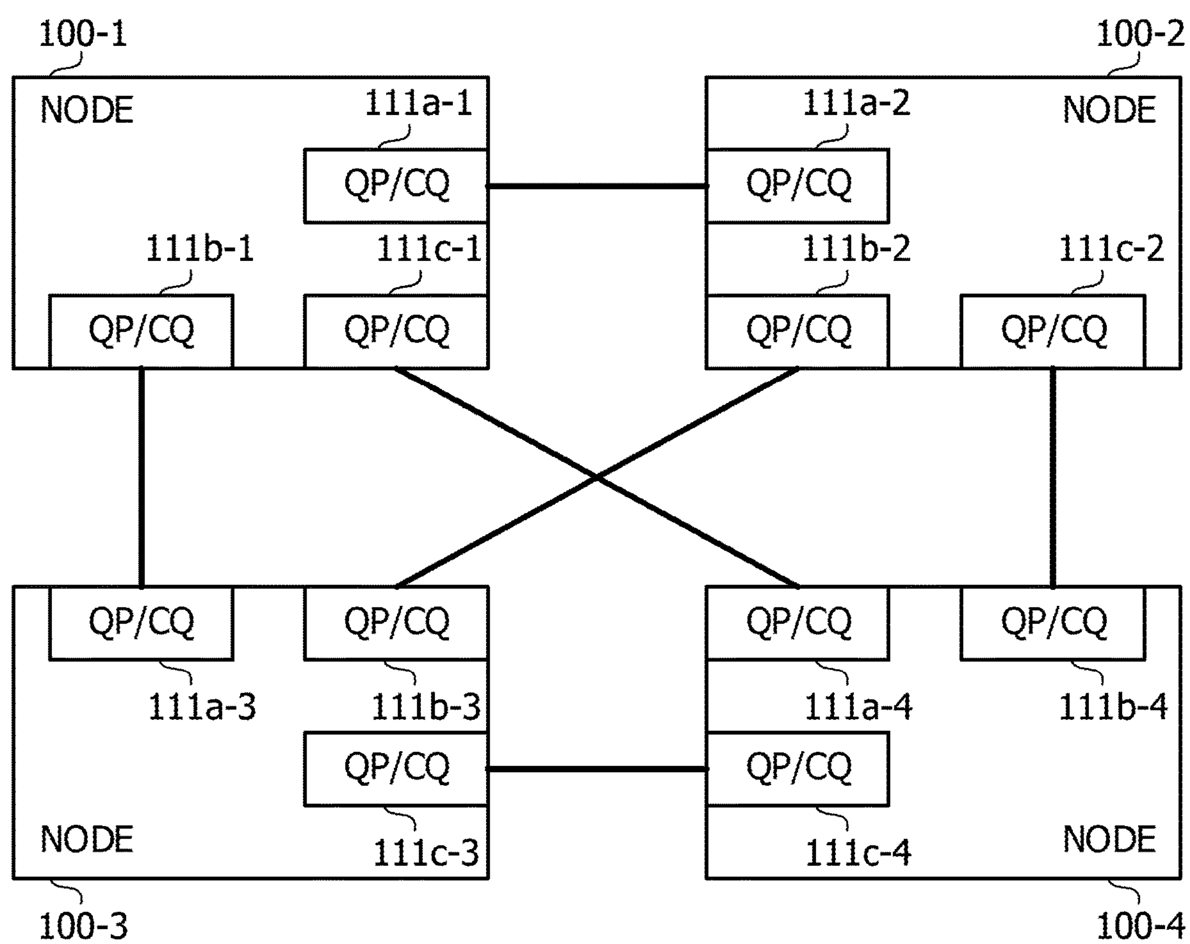
FIG. 6 is a diagram illustrating the disposition of QP/CQ in this embodiment.

In relation to the problem, in this embodiment, QP/CQs are arranged as illustrated in FIG. 6 below.

FIG. 6 is a diagram illustrating the disposition of QP/CQs in this embodiment. In this embodiment, one node has only one QP/CQ for each node of communication partners. Specifically, as illustrated in FIG. 6, the node 100-1 has QP/CQs 111*a*-1, 111*b*-1, and 111*c*-1 for communicating with the nodes 100-2, 100-3, and 100-4, respectively. The node 100-2 has QP/CQs 111*a*-2, 111*b*-2, 111*c*-2 for communicating with the nodes 100-1, 100-3 and 100-4, respectively. The node 100-3 has QP/CQs 111*a*-3, 111*b*-3, 111*c*-3 for communicating with the nodes 100-1, 100-2 and 100-4, respectively. The node 100-4 has QP/CQs 111*a*-4, 111*b*-4, and 111*c*-4 for communicating with the nodes 100-1, 100-2 and 100-3, respectively.

Figure 7:
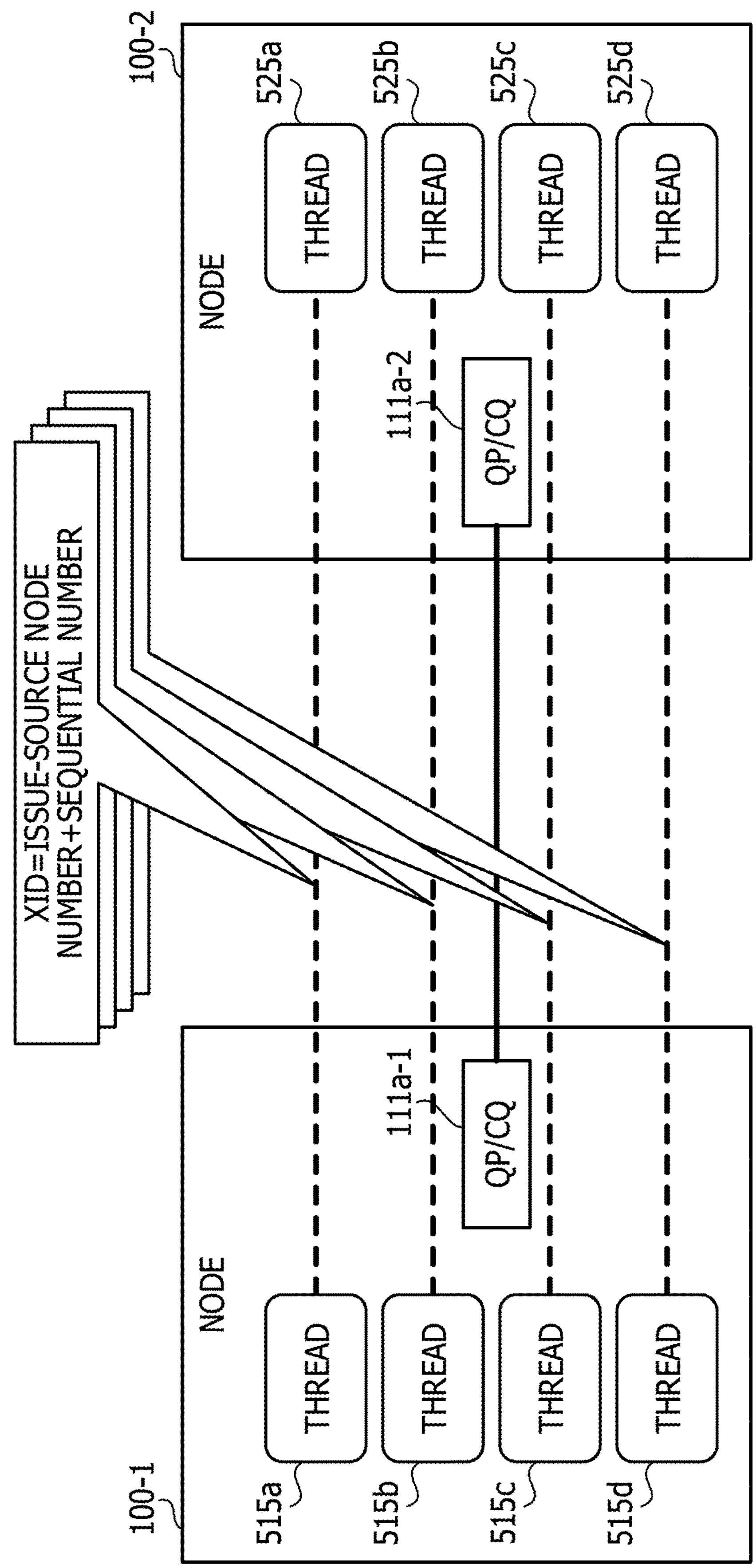
FIG. 7 is a diagram for explaining communication between a plurality of threads.

In this manner, in this embodiment, only one QP/CQ within one node is limited to be used for communication with another node. As illustrated in FIG. 7 below, on one node, a plurality of threads communicating with another node share one QP/CQ.

FIG. 7 is a diagram for explaining communication between a plurality of threads. In FIG. 7, as an example, there is described communication between the node 100-1 and the node 100-2. It is considered that the threads 515*a* to 515*d* are executed on the node 100-1 and the threads 525*a* to 525*d* are executed on the node 100-2. Communication is performed between the thread 515*a* and the thread 525*a*, between the thread 515*b* and the thread 525*b*, between the thread 515*c* and the thread 525*c*, and between the thread 515*d* and the thread 525*d*, respectively.

The node 100-1 has a QP/CQ 111*a*-1 for communicating with the node 100-2. The QP/CQ 111*a*-1 is shared by the threads 515*a* to 515*d* in a case where communication with the node 100-2 is performed. On the other hand, the node 100-2 has a QP/CQ 111*a*-2 for communicating with the node 100-1. The threads 525*a* to 525*d* share the QP/CQ 111*a*-2 in a case where communication with the node 100-1 is performed.

However, for this configuration, for example in a case where a reception request is issued from each of the threads 525*a* to 525*d*, entries of completion having destinations as the threads 525*a* to 525*d*, respectively, coexist in the CQ of the QP/CQ 111*a*-2. At this time, the threads 525*a* to 525*d* may not determine to which thread an entry stored in the CQ of the QP/CQ 111*a*-2 is addressed.

Therefore, in this embodiment, an "XID" which is a unique identification number in the entire system is assigned to each connection established between threads. In a case where a message is transmitted from a certain thread to a thread of another node, an XID corresponding to a connection between these threads is added to the transmitted message. Therefore, in a case where a thread of a receiving-side node acquires a received message based on an entry acquired from the CQ, the thread may determine, from the XID included in the received message, whether or not the entry is addressed to the thread itself.

The XID is generated by combining a node number indicating a node that issued the XID and a number changed sequentially each time the XID is issued. Since the XID includes an issue-source node number, it is possible not to generate the same XID on any other node. As described below, the XID is generated in a case where a connection between threads is established. The issue-source node refers to a node that suggested the establishment of the connection.

Furthermore, in this embodiment, in a case where a certain thread acquires an entry from the CQ by polling and the entry is addressed to another thread itself, it is possible for another thread to recognize the fact that the entry is addressed to another thread itself. For example, in a case where the thread 525*a* polls for the CQ of the QP/CQ 111*a*-2 and acquires an entry indicating reception completion, and the entry is addressed to the thread 525*b* itself, the thread 525*a* transfers a received message corresponding to the entry to the thread 525*b*. The thread 525*b* may continue processing using the received message.

As described above, in this embodiment, only one CQ within one node is limited to be used for communication with another node. In a case where a thread of a node acquires an entry from the CQ by polling and determines, from an XID, to which thread the entry is addressed, the thread causes a destination thread to recognize the completion of communication processing corresponding to the entry related to the destination thread.

Therefore, even though there is a difference in the number of communication connections among threads, there is a low probability that each thread may not acquire an entry addressed to the thread itself in a case where each thread performs polling for the CQ. As a result, it is possible to reduce the number of unnecessary polling so that the utilization efficiency of resources such as a CPU and a memory is improved. By improving the utilization efficiency of resources on the node, it is possible to increase a response speed in response to the IO request from the host apparatus.

For example, the QP/CQ is generated in the memory region of each node at an initial stage in which the operation of the storage system is started. For example, each node acquires device information of the HCA 107 by designating the address of the HCA 107 of another node, and generates the QP/CQ corresponding to another node based on the device information. It is possible to communicate between connected nodes by recognizing the completion of generating the QP/CQ between the nodes.

Processing Function of Node

Figure 8:
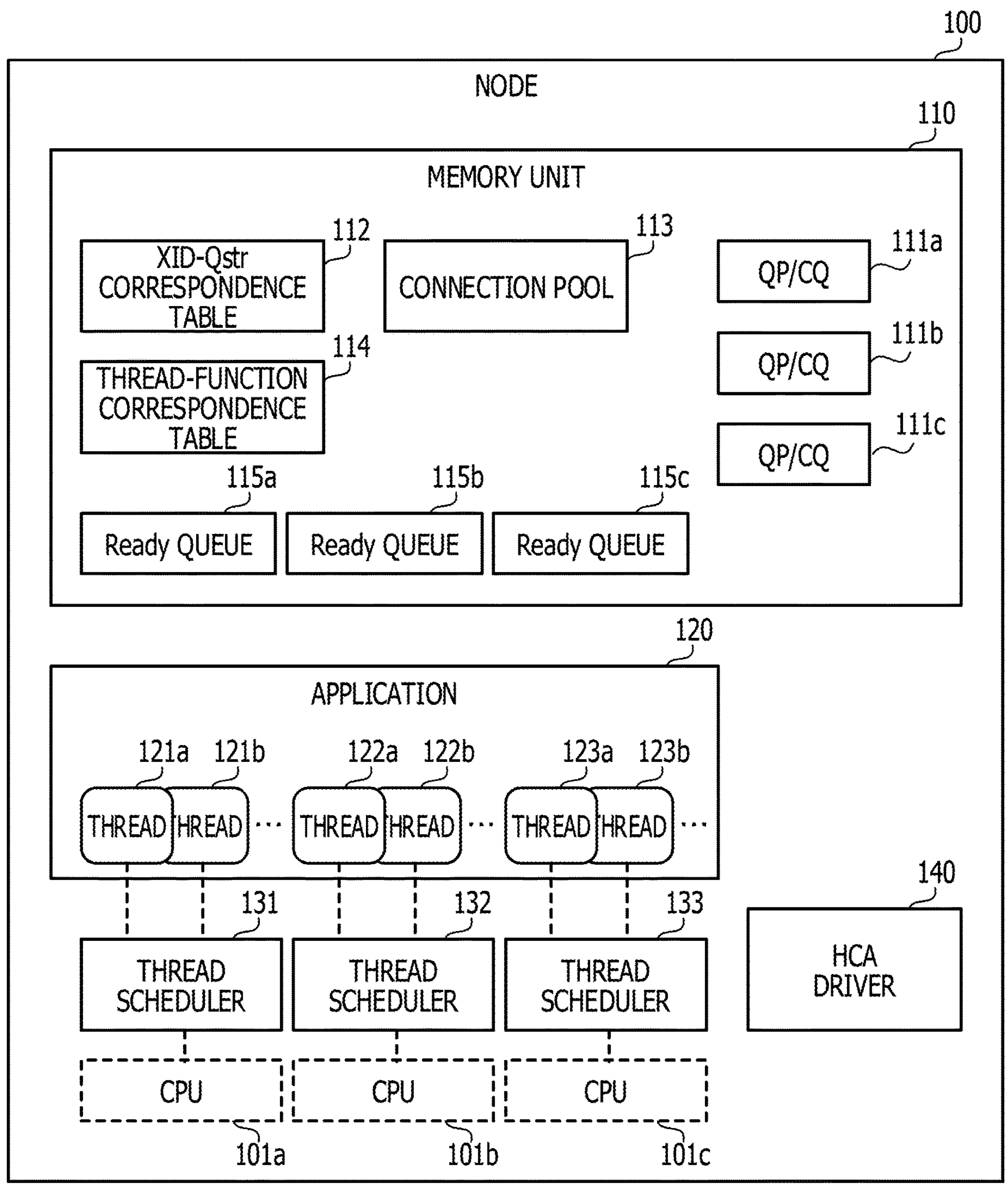
FIG. 8 is a block diagram illustrating a configuration example of processing functions that a node includes.

FIG. 8 is a block diagram illustrating a configuration example of processing functions that a node includes. The node 100 has a memory unit 110, an application 120, thread schedulers 131 to 133, and an HCA driver 140.

The memory unit 110 is implemented, for example, as a storage region of the memory 102. The QP/CQs 111*a* to 111*c*, an XID-Qstr correspondence table 112, a connection pool 113, a thread-function correspondence table 114, and Ready queues 115*a* to 115*c* are stored in the memory unit 110.

The QP/CQs 111*a* to 111*c* are QP/CQs used for communication with other nodes. As described above, the QP/CQs 111*a* to 111*c* are associated with individual nodes, respectively.

The XID-Qstr correspondence table 112 holds the correspondence relationship between an XID and a queuing structure (Q-Structure). In the XID-Qstr correspondence table 112, each time a connection between nodes is established and a new XID is issued, a record including the XID and information indicating the queuing structure is additionally registered. As described below, the queuing structure is a data structure for managing threads in a suspended state, and one queuing structure is generated for one XID.

The connection pool 113 holds an unused connection structure. As described below, the connection structure is a data structure used for communication through a connection between threads, and one connection structure is used for one XID.

The thread-function correspondence table 114 holds the correspondence relationship between the type of the processing content of the thread and the function executed by the type of the thread.

Ready queues 115*a* to 115*c* are a queue in which entries corresponding to threads to be executed are stored. Ready queues 115*a*, 115*b*, and 115*c* are referred to by thread schedulers 131, 132, and 133, respectively.

The processing of the application 120 is implemented, for example, by executing a predetermined application program using the CPUs 101*a* to 101*c*. The application 120, for example, executes control processing of access to the storage. The processing of the application 120 includes a plurality of threads.

The processing of the thread schedulers 131 to 133 and the HCA driver 140 is implemented, for example, by executing the OS program by the CPUs 101*a* to 101*c*.

Based on the ready queue 115*a*, the thread scheduler 131 controls the execution order of threads 121*a*, 121*b*, and, . . . , executed by the CPU 101*a* among threads of the application 120. Based on the ready queue 115*b*, the thread scheduler 132 controls the execution order of threads 122*a*, 122*b*, and, . . . , executed by the CPU 101*b* among threads of the application 120. Based on the ready queue 115*c*, the thread scheduler 133 controls the execution order of threads 123*a*, 123*b*, and, . . . , executed by the CPU 101*c* among threads of the application 120.

The HCA driver 140 controls the operation of the HCA 107. The HCA driver 140 provides the application 120 with an application programming interface (API) for using the HCA 107.

Polling for the CQ and Thread Scheduling

Next, there is described polling for the CQ and thread scheduling. Firstly, with reference to FIGS. 9 and 10, a comparative example of thread scheduling is described, and then with reference to FIG. 11, thread scheduling according to this embodiment is described.

Figure 9:
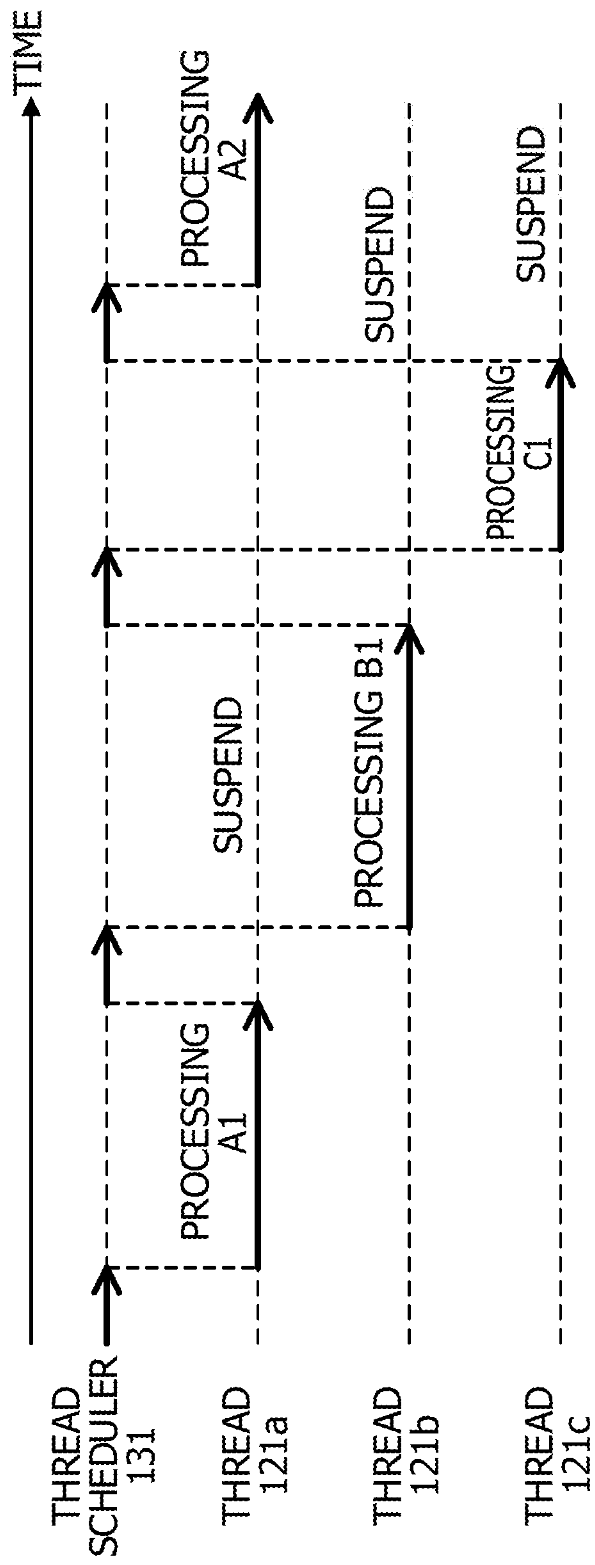
FIG. 9 is a diagram illustrating a first comparative example of thread scheduling.

FIG. 9 is a diagram illustrating a first comparative example of thread scheduling. FIG. 9 illustrates scheduling of threads by the thread scheduler 131 as an example. The thread scheduler 131 sequentially acquires entries from the ready queue 115*a* and starts execution of threads corresponding to the acquired entries. In a case where a thread executes processing with the limit of a certain length, the thread is suspended and transfers control to the thread scheduler 131.

For example, as illustrated in FIG. 9, the thread scheduler 131 starts execution of the thread 121*a*. After executing the processing A1, the thread 121*a* is suspended and transfers control to the thread scheduler 131. Next, the thread scheduler 131 starts execution of the thread 121*b*. After executing the processing B1, the thread 121*b* is suspended and transfers control to the thread scheduler 131. Next, the thread scheduler 131 starts execution of the thread 121*c*. After executing the processing C1, the thread 121*c* is suspended and transfers control to the thread scheduler 131. Next, the thread scheduler 131 starts execution of the thread 121*a*. The thread 121*a* executes processing A2 following to the processing A1.

Figure 10:
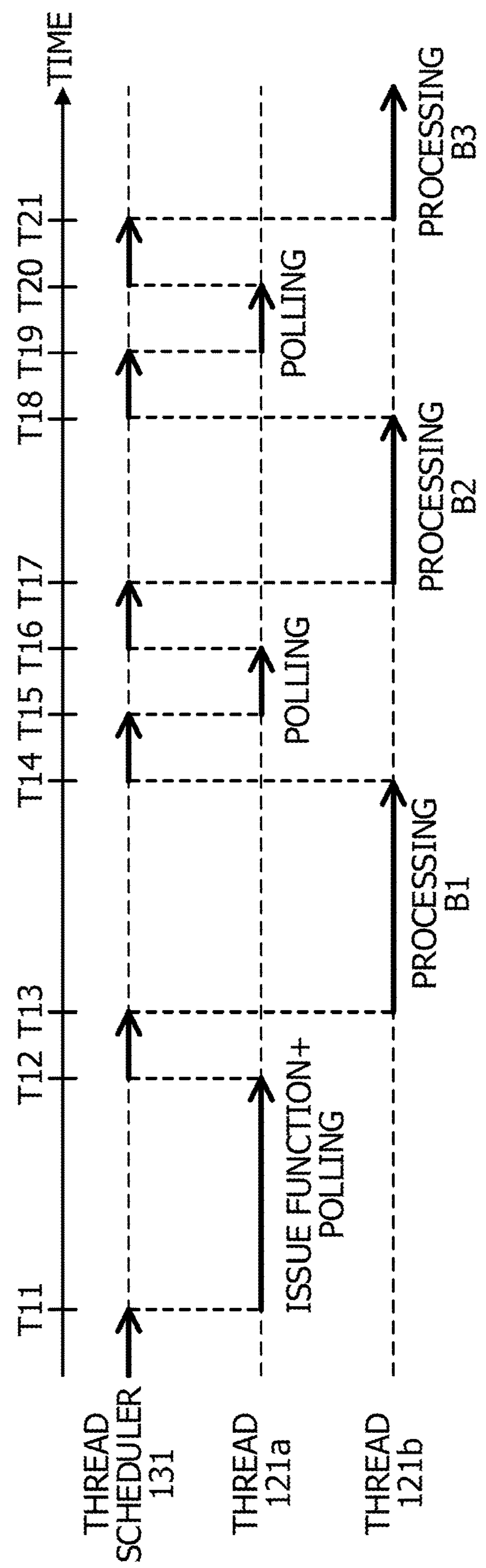
FIG. 10 is a diagram illustrating a second comparative example of thread scheduling.

FIG. 10 is a diagram illustrating a second comparative example of thread scheduling. FIG. 10 illustrates an example of a case that threads 121*a* and 121*b* are executed and the thread 121*a* performs the reception processing of a message.

Firstly, the thread scheduler 131 starts execution of the thread 121*a* (a timing T11). The thread 121*a* issues the receive function "recv" to the HCA driver 140. Therefore, an entry corresponding to a received message is registered in the QP. The thread 121*a* enters a state of waiting to receive a message and issues a function (ibv_poll_cq) for polling for the CQ each time a certain time elapses until an entry corresponding to the reception request may be acquired from the CQ. However, in a case where a corresponding entry may not be acquired even though the function is issued a predetermined number of times, the thread 121*a* temporarily is suspended and transfers control to the thread scheduler 131 (a timing T12).

The thread scheduler 131 starts execution of the thread 121*b* (a timing T13). After executing the processing B1, the thread 121*b* is suspended and transfers control to the thread scheduler 131 (a timing T14). The thread scheduler 131 wakes up the thread 121*a* (a timing T15). The wake-up thread 121*a* repeats issuing of a polling function again. However, in a case where a corresponding entry may not be acquired even though the function is issued a predetermined number of times, the thread 121*a* is suspended and transfers control to the thread scheduler 131 (a timing T16).

The thread scheduler 131 starts execution of the thread 121*b* (a timing T17). After executing processing B2 following to the processing B1, the thread 121*b* is suspended and transfers control to the thread scheduler 131 (a timing T18). The thread scheduler 131 wakes up the thread 121*a* (a timing T19). The wake-up thread 121*a* repeats issuing of a polling function again. However, in a case where the corresponding entry may not be acquired even though the function is issued a predetermined number of times, the thread 121*a* is suspended and transfers control to the thread scheduler 131 (a timing T20). The thread scheduler 131 starts execution of the thread 121*b* (a timing T21), and the thread 121*b* executes processing B3 following to the processing B2.

As in the above example, in a case where a received message does not arrive for a long time after the receive function "recv" is issued, the thread 121*a* repeatedly performs the operation of waking up, polling, and suspending. Each time the thread 121*a* is wake-up or suspended, context switching occurs. Context switching involves processing such as saving data in registers so that a processing load on the CPU is large. Therefore, in a case where the waking-up or suspending of the thread 121*a* is repeated as described above, there are problems that the processing load of the CPU increases, the processing of the other executable thread 121*b* is delayed, and processing efficiency decreases.

In relation to the problems, in this embodiment, not only a thread but also a thread scheduler may perform polling for the CQ. After issuing the receive function "recv", the thread performs polling for the CQ only once, and is suspended in a case where a message addressed to the thread itself does not arrive. Hereinafter, the polling for obtaining an entry corresponding to this thread is executed by a thread scheduler (or another thread).

Figure 11:
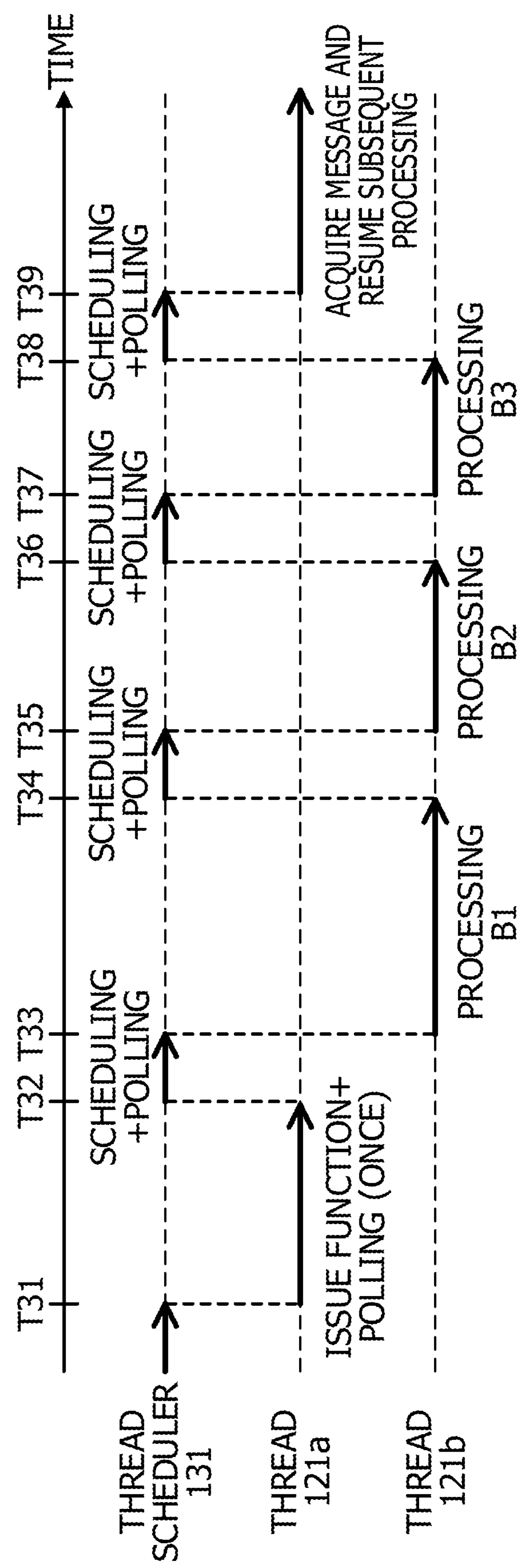
FIG. 11 is a diagram illustrating an example of thread scheduling according to this embodiment.

FIG. 11 is a diagram illustrating an example of thread scheduling according to this embodiment. FIG. 11 illustrates an example of a case that threads 121*a* and 121*b* are executed and the thread 121*a* performs reception processing of a message, similarly to a comparative example of FIG. 10.

Firstly, the thread scheduler 131 starts execution of the thread 121*a* (a timing T31). The thread 121*a* issues the receive function "recv" to the HCA driver 140, and then performs polling for the CQ only once. At this time, if the corresponding entry may not be acquired, the thread 121*a* immediately is suspended and transfers control to the thread scheduler 131 (a timing T32).

On the other hand, each time control is transferred, the thread scheduler 131 polls for the CQ as well as schedules a thread to be executed next. In the example of FIG. 11, in a case where control is transferred from the thread 121*a* at the timing T32, the thread scheduler 131 selects the thread 121*b* as a thread to be executed next and polls for the CQ. In a case where this is completed, the thread scheduler 131 starts execution of the thread 121*b* (a timing T33).

In a case where the execution of the processing B1 by the thread 121*b* is completed, control is transferred to the thread scheduler 131 (a timing T34), the thread scheduler 131 performs scheduling and polling. If an entry corresponding to the thread 121*a* may not be acquired from the CQ, the thread 121*b* is wake-up and executes a subsequent processing B2 (a timing T35).

In a case where the execution of the processing B2 is completed, control is transferred to the thread scheduler 131 (a timing T36), the thread scheduler 131 performs scheduling and polling. Here, also If an entry corresponding to the thread 121*a* may not be acquired from the CQ, the thread 121*b* is wake-up and executes a subsequent processing B3 (a timing T37).

In a case where the execution of the processing B3 is completed, control is transferred to the thread scheduler 131 (a timing T38), the thread scheduler 131 performs scheduling and polling. Here, in a case where an entry corresponding to the thread 121*a* may be acquired from the CQ, the thread scheduler 131 wakes up the thread 121*a* (a timing T39). The thread 121*a* acquires the received message and resumes subsequent processing.

As described above, the thread 121*a* performs polling for the CQ only once after issuing the receive function "recv", and is suspended if a corresponding entry may not be acquired. Hereinafter, the polling for acquiring an entry corresponding to this thread is performed by the thread scheduler 131. In a case where the thread scheduler 131 acquires an entry corresponding to the thread 121*a* from the CQ, the thread 121*a* is wake-up.

Through such a processing, the thread 121*a* that has failed in polling is not wake-up and suspended repeatedly. Therefore, the number of occurrences of unnecessary context switching is reduced, and the processing load on the CPU decreases. As a result, the processing efficiency of the CPU is improved, and the execution delay of an executable thread 121*b* may be reduced.

Figure 12:
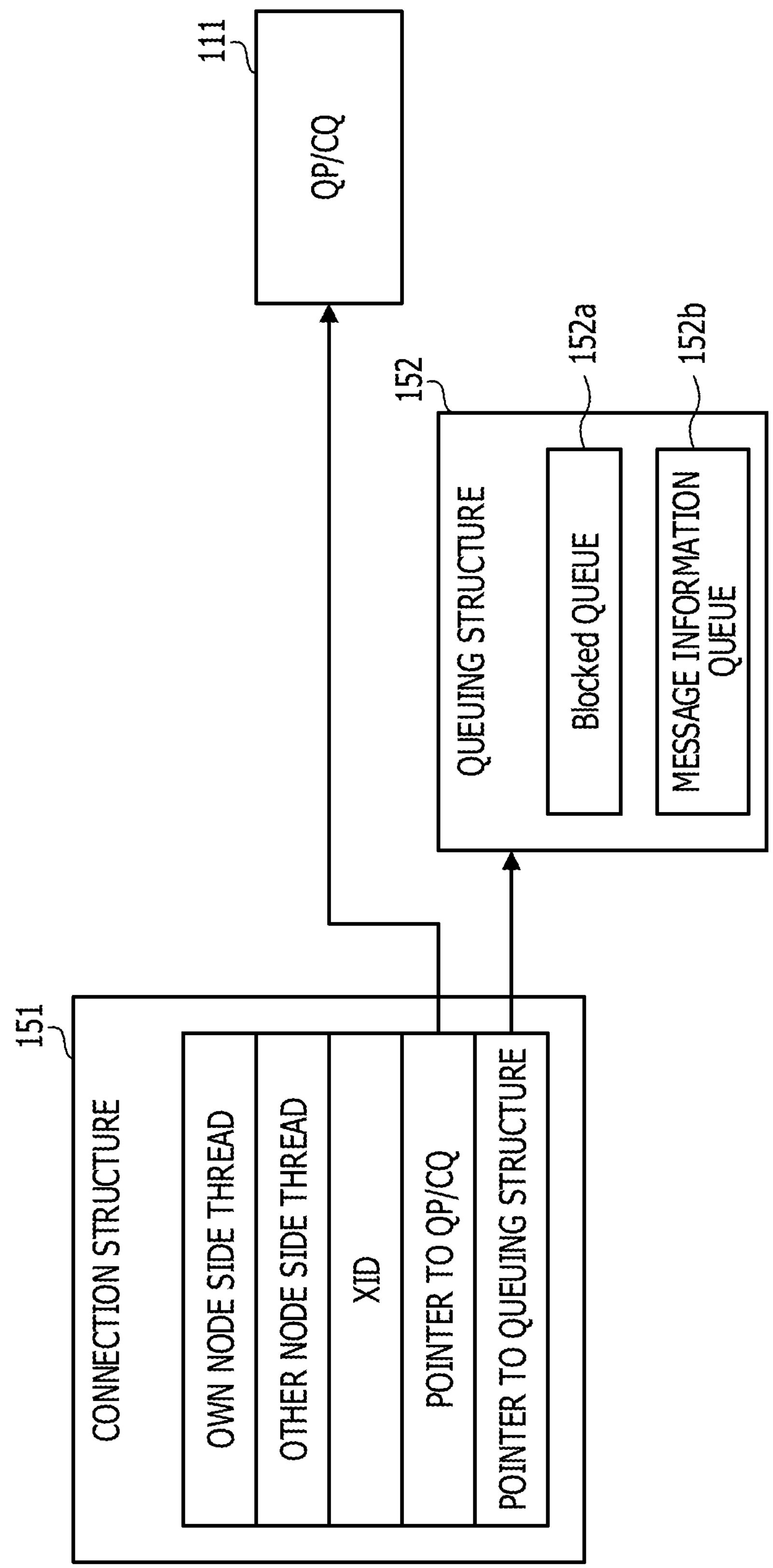
FIG. 12 is a diagram illustrating an example of a data structure used in the thread scheduling.

FIG. 12 is a diagram illustrating an example of a data structure used in thread scheduling. In this embodiment, as described above, a connection structure 151 and a queuing structure 152 are used for implementing thread scheduling.

Each time a connection between threads is established, the connection structure 151 is generated by threads on both sides of the connection, respectively, and is used for communication between one thread and the other thread. The connection structure 151 holds respective identification numbers of an own node side thread and another node side thread, an XID, a pointer to QP/CQ, and a pointer to the queuing structure.

The own node side thread indicates a thread of its own node of the nodes on both sides of the connection and the other node side thread indicates a thread of the other node thereof. As described above, the XID is a unique number generated for each connection between threads. The pointer to the QP/CQ indicates the positions of the QP and the CQ within the QP/CQ 111 used for communication with the thread of a communication partner. A pointer to the queuing structure indicates the position of a corresponding queuing structure 152.

The queuing structure 152 is a data structure used for managing the state of the thread on its own node side. The queuing structure 152 holds a blocked queue 152*a* and a message information queue 152*b*. An entry corresponding to a thread in a suspended state is retrieved from Ready queues 115*a* to 115*c* and stored in the blocked queue 152*a*. An entry including a pointer indicating a buffer region for storing a received message is stored in the message information queue 152*b*.

Figure 13:
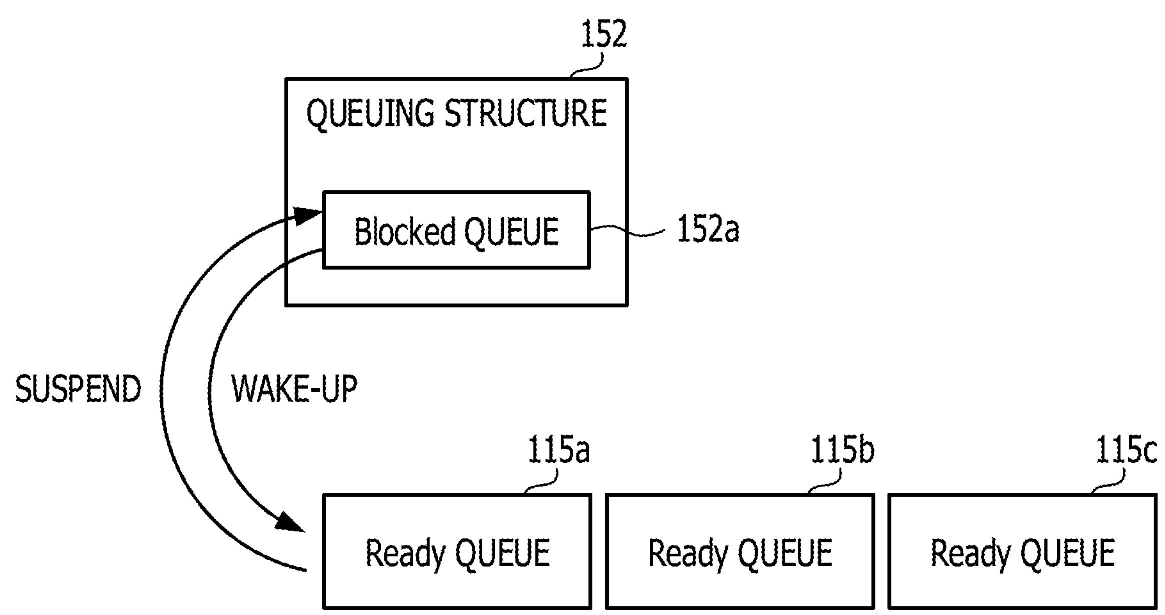
FIG. 13 is a diagram for explaining suspend and wake-up operations due to an entry movement between queues.

FIG. 13 is a diagram for explaining suspend and wake-up operations due to an entry movement between queues. In a case where a thread that issued the receive function "recv" fails in polling, the thread retrieves a corresponding entry from any one of the ready queues 115*a* to 115*c* and stores the corresponding entry in the blocked queue 152*a* of the queuing structure 152, thereby transitioning to the suspended state. At this time, the thread registers an entry including a pointer indicating a buffer region for storing the received message in the message information queue 152*b* of the queuing structure 152. This buffer region is a memory region for saving the received message stored in the receive buffer using the HCA driver 140.

Thereafter, the received message stored in the receive buffer is set in the buffer region by the thread scheduler or another thread, and a corresponding entry is retrieved from the blocked queue 152*a* and registered in any one of the ready queues 115*a* to 115*c*. Therefore, a thread corresponding to this entry is wake-up.

A state in which the thread is wake-up means a state in which the corresponding entry is registered in any one of the ready queues 115*a* to 115*c*, and in a case where the thread scheduler selects a thread to be executed next, targets to be selected includes this thread. An entry is retrieved from any one of the ready queues 115*a* to 115*c* to the thread scheduler, thereby starting execution of a thread corresponding to the entry.

Hereinafter, a specific example of state transition of a thread is described with reference to FIGS. 14 and 15. As an example, FIGS. 14 and 15 illustrates a case that thread #0 and thread #1 are executed on node 100-1.

Figure 14:
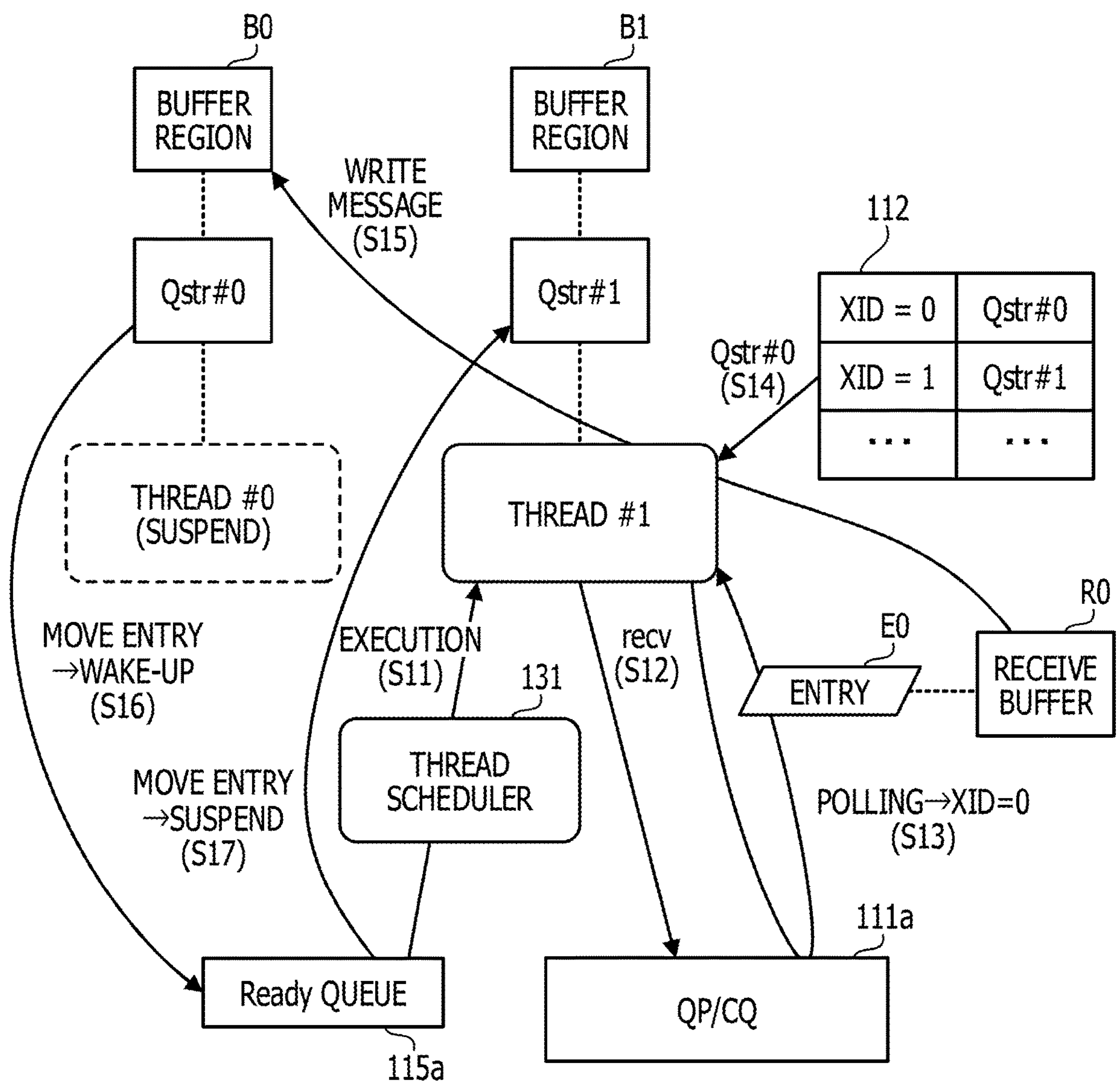
FIG. 14 is a diagram illustrating a first example of state transition of a thread.
Figure 15:
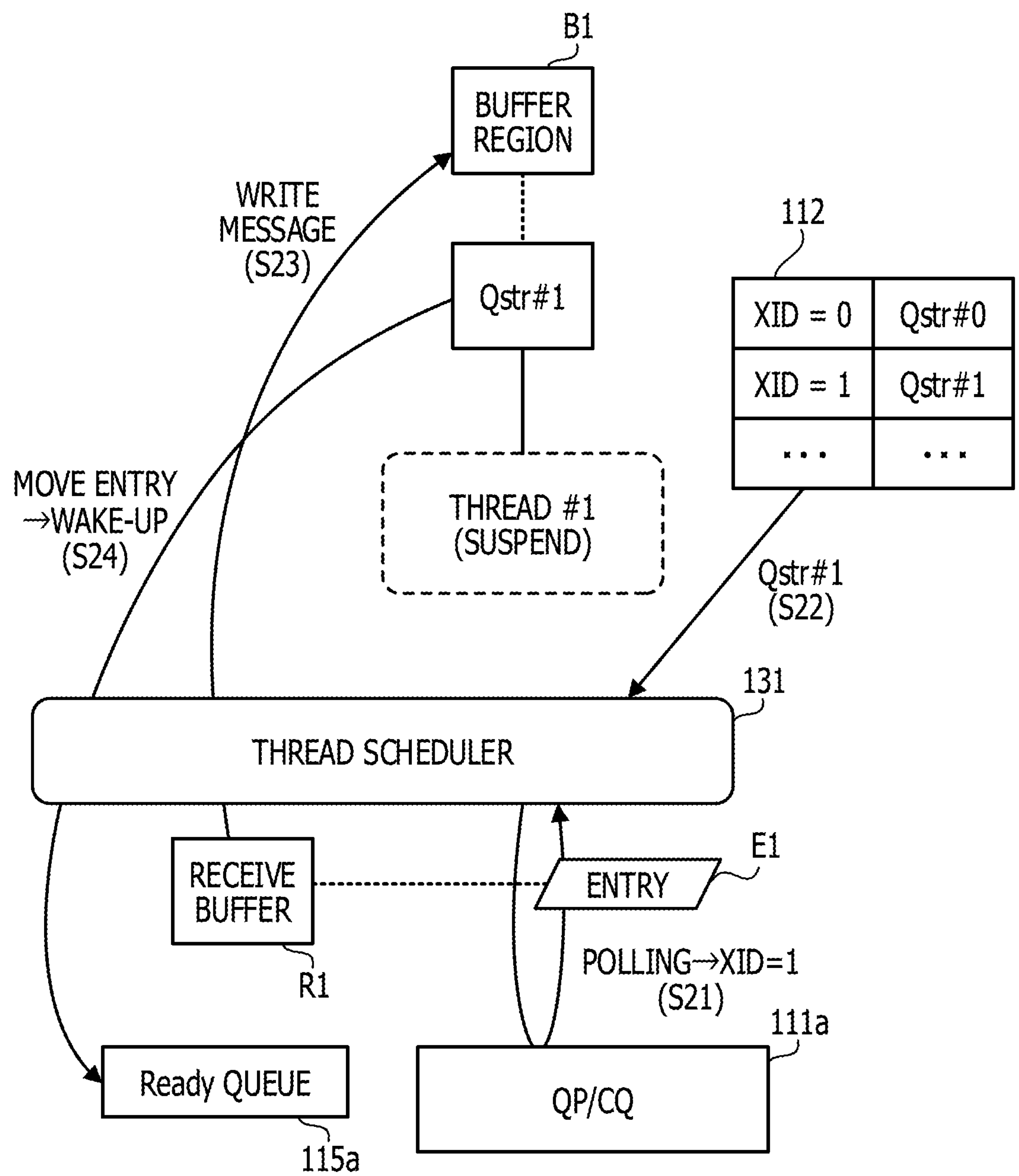
FIG. 15 is a diagram illustrating a second example of state transition of a thread.

FIG. 14 is a diagram illustrating a first example of state transition of a thread. In the initial state of FIG. 14, a connection between a thread #0 and a thread of another node (herein, it is considered to be a thread #01 of a node 100-2) is established. An XID "0" is assigned to this connection, and a queuing structure Qstr #0 is associated with the XID "0" in the XID-Qstr correspondence table 112. A connection between the thread #1 and another thread (it is considered to be a thread #11) of the node 100-2 is established. An XID "1" is assigned to this connection, and a queuing structure Qstr #1 is associated with the XID "1" in the XID-Qstr correspondence table 112.

Furthermore, the thread #0 enters the suspended state after requesting the reception of a message, and an entry corresponding to the thread #0 is stored in the blocked queue 152*a* of the queuing structure Qstr #0. An entry including a pointer indicating a buffer region B0 for storing a received message is registered in the message information queue 152*b* of the queuing structure Qstr #0.

In InfiniBand, it is guaranteed that a transmitting order of the message and a receiving order of the message are not exchanged.

From the above state, it is considered that the thread scheduler 131 acquires an entry corresponding to the thread

1 from the ready queue 115*a* and starts execution of the thread #1 (step S11). The thread #1 issues the receive function "recv" to the HCA driver 140 and requests reception of the message (step S12). Therefore, an entry corresponding to the reception request from the thread #1 is stored in the QP of the QP/CQ 111*a*. Furthermore, the thread #1 performs polling for the CQ of the QP/CQ 111*a* (step S13).

The thread #1 acquires an entry E0 from the CQ and acquires the received message from the receive buffer R0 indicated by the entry E0. Here, if the acquired received message includes the XID "1", the thread #1 recognizes that the entry is addressed to the thread #1 itself and may execute subsequent processing using the received message.

However, in the example of FIG. 14, it is considered that the acquired received message includes the XID "0". In this case, a message requested by the thread #0 has been received by the HCA 107, and the received message is stored in the receive buffer R0. The thread #1 recognizes that the acquired entry is not addressed to the thread #1 itself, refers to the XID-Qstr correspondence table 112, and specifies the queuing structure Qstr #0 corresponding to the XID "0" (step S14).

The thread #1 acquires an entry from the message information queue 152*b* of the queuing structure Qstr #0 and writes the received message stored in the receive buffer R0, into a buffer region B0 indicated by the acquired entry (step S15). Furthermore, the thread #1 retrieves an entry from the blocked queue 152*a* of the queuing structure Qstr #0 and moves the entry to the ready queue 115*a* (step S16). Therefore, the thread #0 is wake-up. That is, in a case where the moved entry is acquired by the thread scheduler 131 and execution of the thread #0 is started, the thread #0 may continue processing using the received message written in the buffer region B0.

The buffer region B0 is used for saving the received message stored in the receive buffer R0. By completing the polling in step S13, the receive buffer R0 indicated by the acquired entry E0 is released. However, as the received message stored in the receive buffer R0 is saved in the buffer region B0, the thread #0 may acquire the received message from the buffer region B0 after the completion of the polling.

In a case where the above processing is completed, the thread #1 moves the entry acquired from the ready queue 115*a* in step S11 to the blocked queue 152*a* of the queuing structure Qstr #1 (step S17). Furthermore, the thread #1 stores an entry including a pointer indicating a buffer region B1 for storing the received message, in the message information queue 152*b* of the queuing structure Qstr #1. Therefore, the thread #1 is suspended.

FIG. 15 is a diagram illustrating a second example of state transition of a thread. After the thread #1 is suspended as illustrated in FIG. 14, the entry E1 is acquired by polling for the CQ of the QP/CQ 111*a* by the thread scheduler 131. Then, it is considered that a received message including the XID "1" is acquired from a receive buffer R1 indicated by the acquired entry E1 (step S21).

The thread scheduler 131 refers to the XID-Qstr correspondence table 112 and specifies the queuing structure Qstr #1 corresponding to the XID "1" (step S22). The thread scheduler 131 acquires an entry from the message information queue 152*b* of the queuing structure Qstr #1 and writes the received message stored in the receive buffer R1, into a buffer region B1 indicated by the acquired entry (step S23). Furthermore, the thread scheduler 131 retrieves an entry from the blocked queue 152*a* of the queuing structure Qstr #1 and moves the entry to the ready queue 115*a* (step S24).

Therefore, the thread #1 is wake-up. That is, in a case where the moved entry is acquired by the thread scheduler 131 and execution of the thread #1 is started, the thread #1 may continue processing using the received message written in the buffer region B1.

As in the examples of FIGS. 14 and 15, in this embodiment, a thread which fails once in polling for the CQ is suspended without polling any more. Thereafter, by polling for the CQ by the thread scheduler or another thread, an entry corresponding to the suspended thread is acquired from the CQ, thereby waking-up the suspended thread.

With such a mechanism, a thread, which fails in polling and is suspended, is not wake-up until a requested message is received. Therefore, the thread, which fails in polling, is not wake-up and suspended repeatedly for polling again, thereby reducing the number of occurrences of unnecessary context switching. As a result, the processing efficiency of the CPU may be improved.

With the above mechanism, an entry addressed to a thread stored in the CQ is acquired not only by polling by the thread but also by polling by another thread or thread scheduler. The received message corresponding to the acquired entry may be used by the destination thread. This reduces a probability that an entry addressed to any thread may not be acquired in a case where polling is performed. As a result, it is possible to reduce the number of unnecessary polling so that the utilization efficiency of resources such as a CPU and a memory is improved.

Flowchart

Next, the processing of the node 100 is described with reference to a flowchart.

Figure 16:
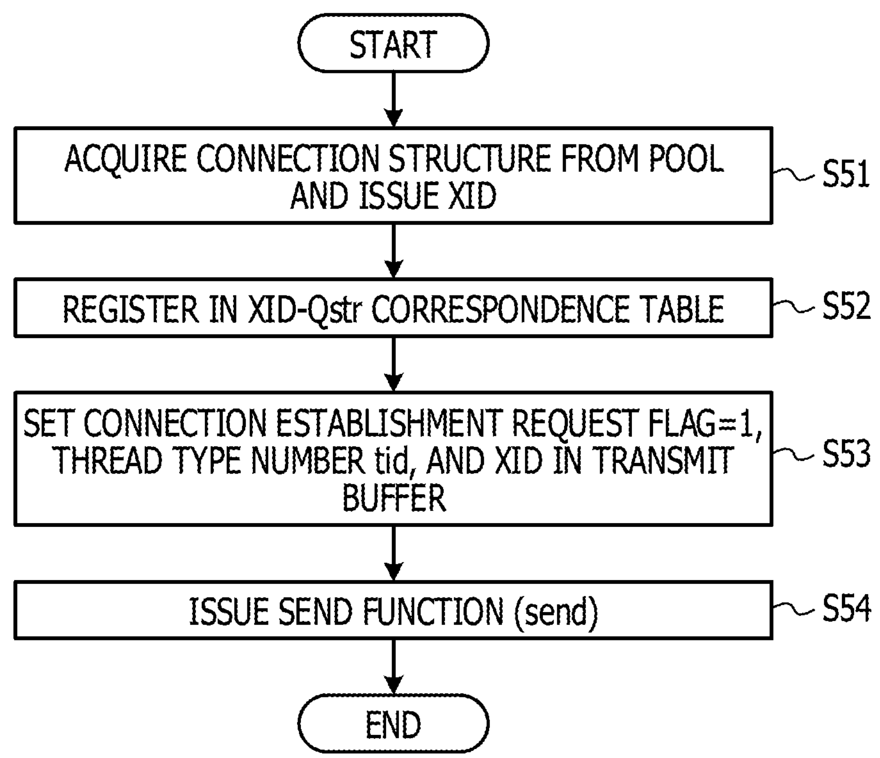
FIG. 16 is a flowchart illustrating an example of a processing procedure to request connection establishment between threads.

FIG. 16 is a flowchart illustrating an example of a processing procedure to request connection establishment between threads. Herein, as an example, a case that the thread #11 of the node 100-1 establishes a connection with the thread #21 of the node 100-2 is illustrated.

Step S51

The thread #11 acquires an unused connection structure 151 from the connection pool 113. At this time, an unused queuing structure 152 is also acquired. The thread #11 registers the thread #11 as its own node side thread and the thread #21 as the other node side thread with respect to the acquired connection structure 151. The thread #11 registers a pointer to the QP/CQ 111*a* used for communication with the node 100-2 and a pointer to the acquired queuing structure 152 with respect to the acquired connection structure 151.

Furthermore, the thread #11 issues a new XID and registers the XID in the acquired connection structure 151. The XID is calculated by combining the number of the node 100-1 and a value obtained by adding "1" to the immediately preceding issued sequential number. Herein, it is considered that the XID "11" is issued for simplicity of explanation.

Step S52

The thread #11 newly registers a record including the issued the XID "11" and information indicating the acquired queuing structure 152 in the XID-Qstr correspondence table 112.

Step S53

The thread #11 sets a connection establishment request flag, a thread type number tid indicating the type of the thread #21 of the communication partner, and the XID "11" in the transmit buffer. The connection establishment request flag is set to "1" indicating a connection establishment request.

Step S54

The thread #11 issues a send function "send" to the HCA driver 140. At this time, the thread #11 sets a pointer to the connection structure 151 and an address of the transmit buffer as arguments.

Therefore, an entry indicating a transmission request for connection establishment is registered in the QP of the QP/CQ 111*a*. Upon acquiring this entry, the HCA driver 140 transmits the information set in the transmit buffer to the node 100-2. Therefore, the newly issued XID "11" is transmitted to the node 100-2 of the partner.

Figure 17:
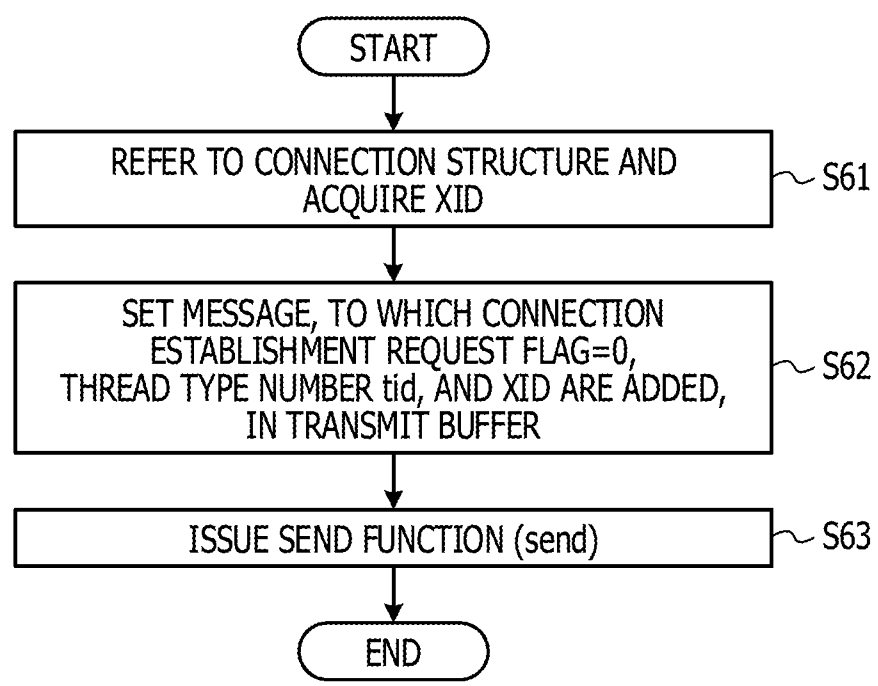
FIG. 17 is a flowchart illustrating an example of a processing procedure to request transmission of a message.

FIG. 17 is a flowchart illustrating an example of a processing procedure to request transmission of a message. Herein, as an example, a case that the thread #11 transmits a message to the thread #21, after the connection with the thread #21 is established by the processing of FIG. 16, is illustrated.

Step S61

The thread #11 refers to the connection structure 151, in which the thread #11 is registered as its own node side thread and the thread #21 is registered as the other node side thread, and acquires the XID "11" from the connection structure 151.

Step S62

The thread #11 sets, in the transmit buffer, a transmitted message to which the connection establishment request flag, the thread type number tid indicating the type of the thread #21 of the communication partner, and the XID "11" are added. The connection establishment request flag is set to "0" indicating no connection establishment request.

Step S63

The thread #11 issues a send function "send" to the HCA driver 140. At this time, the thread #11 sets a pointer to the connection structure 151 and an address of the transmit buffer as arguments.

Therefore, an entry indicating the transmission request of a message is registered in the QP of the QP/CQ 111*a*. Upon acquiring this entry, the HCA driver 140 transmits a transmitted message set in the transmit buffer to the node 100-2. Therefore, the XID "11" is transmitted to the node 100-2 of the partner together with the transmitted message.

Figure 18:
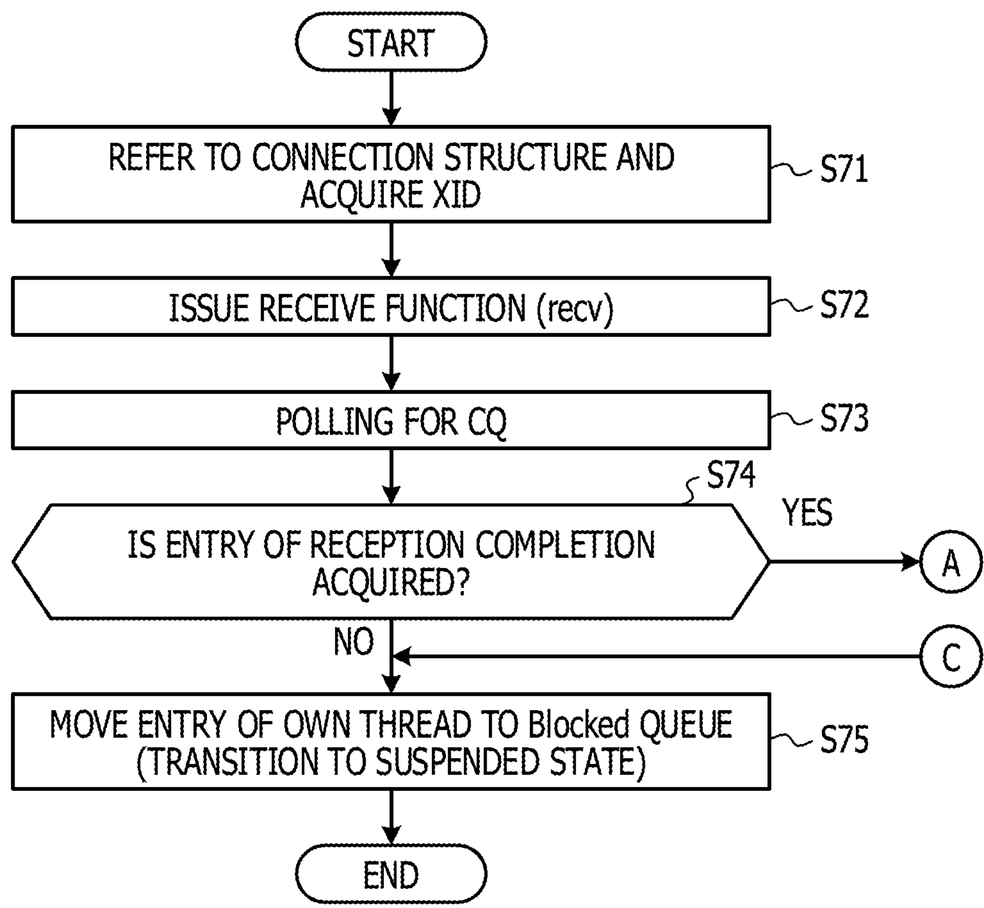
FIG. 18 is a flowchart (part 1) illustrating an example of a processing procedure to request reception of a message.
Figure 19:
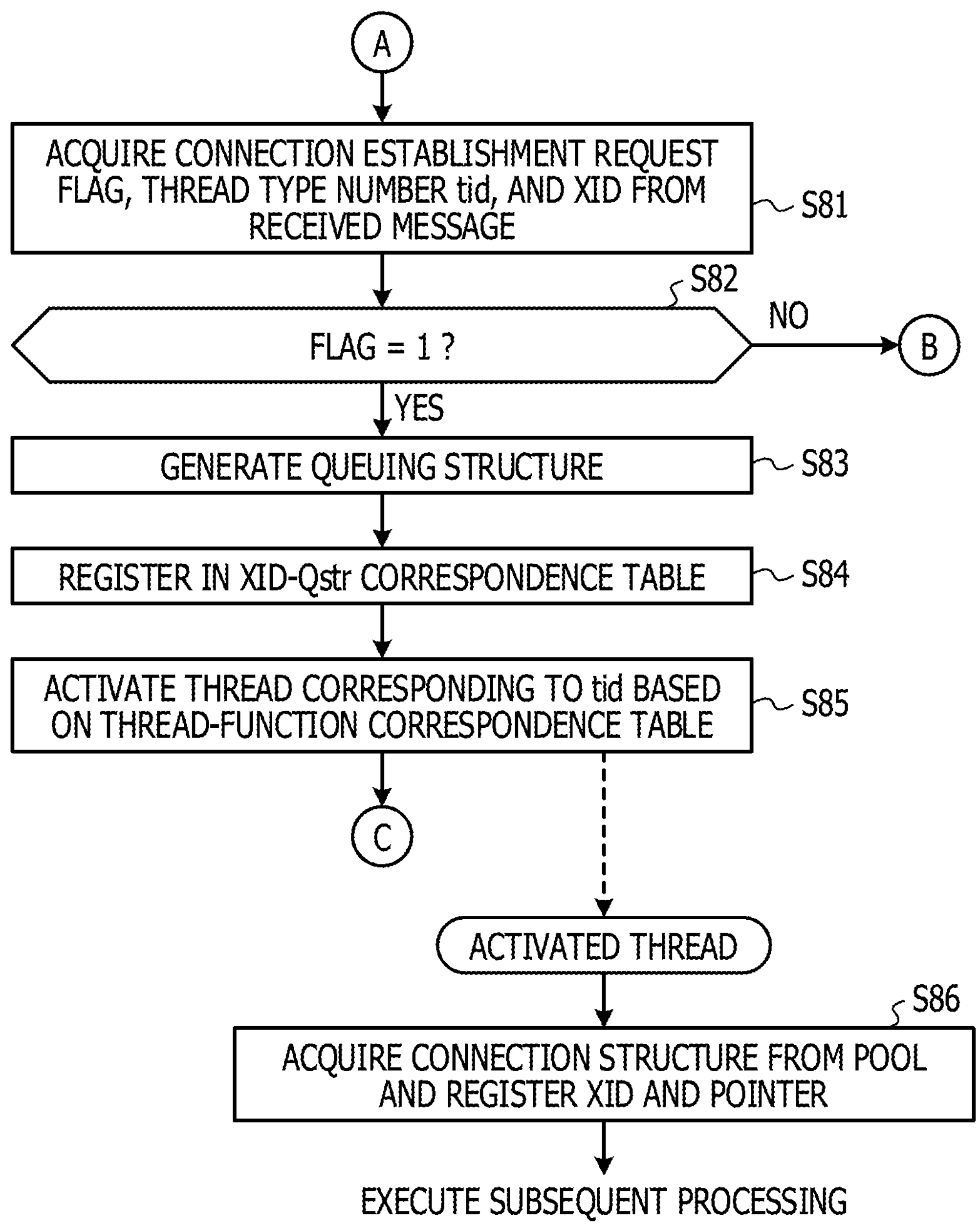
FIG. 19 is a flowchart (part 2) illustrating the example of a processing procedure to request reception of a message.
Figure 20:
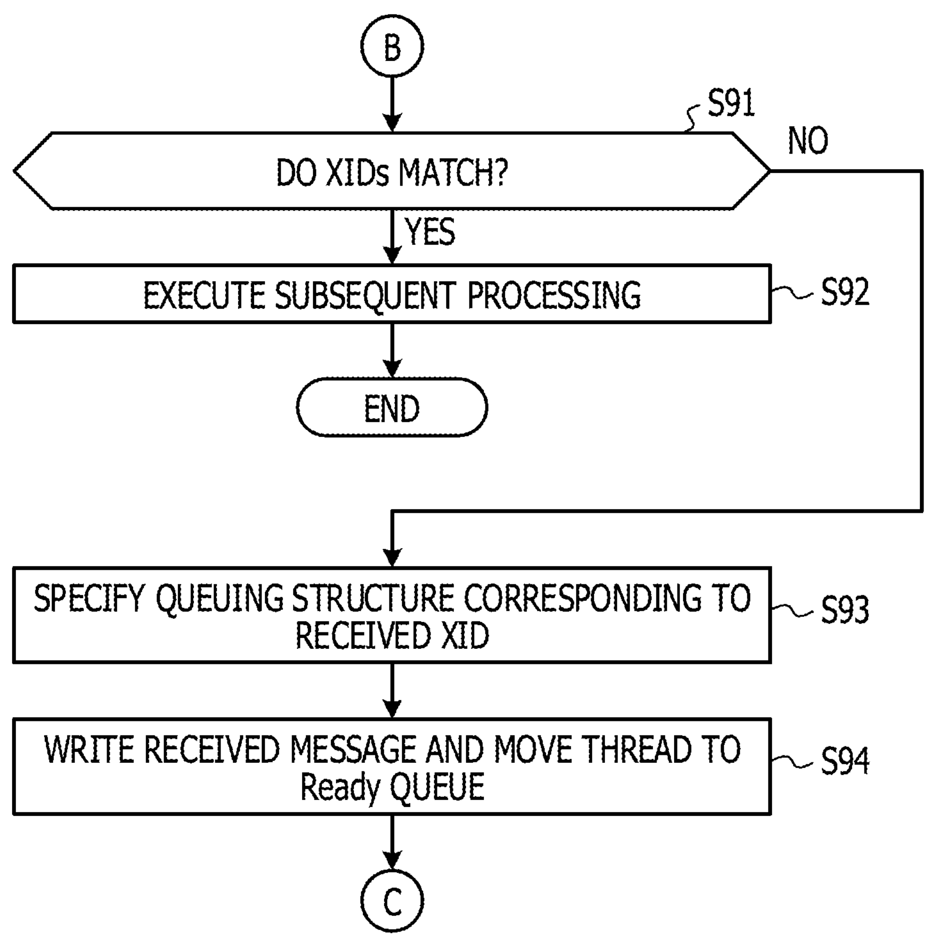
FIG. 20 is a flowchart (part 3) illustrating the example of a processing procedure to request reception of a message.

FIGS. 18 to 20 are flowcharts illustrating an example of a processing procedure to request reception of a message. Herein, as an example, a case where the thread #22 of the node 100-2 receives a message transmitted from the thread #12 of the node 100-1 is illustrated. It is considered that a connection between the thread #12 and the thread #22 has been established, and the XID "12" is assigned to this connection.

Step S71

The thread #22 refers to the connection structure 151, in which the thread #22 is registered as its own node side thread and the thread #12 is registered as the other node side thread, and acquires the XID "12" from the connection structure 151.

Step S72

The thread #22 issues a receive function "recv" to the HCA driver 140. At this time, thread #22 sets a pointer to the connection structure 151 referred to in step S71 and an address of the receive buffer as arguments.

Therefore, an entry indicating the reception request of the message is registered in the QP of the QP/CQ 111*a*. Upon acquiring this entry, the HCA driver 140 receives the message from the node 100-2 and sets the message in the receive buffer. The HCA driver 140 registers an entry indicating reception completion in the CQ of the QP/CQ 111*a*. However, at the time of execution of the next step S73, this entry is not limited to be registered in the CQ.

Step S73

The thread #22 issues, to the HCA driver 140, a function for polling the CQ for communication with the node 100-1, that is, the CQ of the QP/CQ 111*a*. Therefore, polling for the CQ is performed.

Step S74

As a result of the polling, the thread #22 determines whether an entry indicating reception completion could be acquired from the CQ. In a case where the entry may be acquired, the thread #22 executes processing in step S81 of FIG. 19, and in a case where the entry may not be acquired, the thread #22 executes processing in step S75.

The entry acquired in step S74 may not indicate the reception completion corresponding to the reception request in step S72.

In step S74, an entry indicating transmission completion may be acquired. In this case, the thread #22 wakes up the thread that made a transmission request, and then executes the processing in step S75.

Step S75

The thread #22 moves the entry corresponding to the thread #22 acquired by the thread scheduler from the ready queue, to the blocked queue 152*a* of the queuing structure 152. The queuing structure 152 of the movement destination is the queuing structure 152 indicated by a pointer registered in the connection structure 151 referred to in step S71.

The thread #22 stores an entry including a pointer indicating a buffer region for storing the received message, in the message information queue 152*b* of the queuing structure 152. Through the above processing in step S75, the thread #22 transitions to a suspended state.

Hereinafter, the description continues with reference to FIG. 19.

Step S81

The thread #22 acquires the received message corresponding to the entry acquired in step S74, from the receive buffer in which a message received by the HCA driver 140 is stored. The thread #22 acquires a connection establishment request flag, a thread type number tid, and an XID from the received message.

Step S82

In a case where the connection establishment request flag is "1", the thread #22 executes processing in step S83, and in a case where the connection establishment request flag is "0", the thread #22 executes processing in step S91 of FIG. 20.

Step S83

In a case where the connection establishment request flag is "1", it is requested to newly establish a connection between threads. Herein, as an example, it is described that establishment of a connection between thread #11 and thread #21 is requested by processing of FIG. 16. In this case, the received message includes the XID "11".

Firstly, the thread #22 generates a new queuing structure 152.

Step S84

The thread #22 newly registers a record including the XID "11" acquired from the received message and the pointer indicating the queuing structure 152 generated in step S83, in the XID-Qstr correspondence table 112.

Step S85

The thread #22 refers to the thread-function correspondence table 114, and specifies the thread #21 associated with the thread type number tid acquired from the received message. The thread #22 activates the specified thread #21.

After this, the thread #22 executes processing in step S75 in FIG. 18 and transitions to the suspended state.

Step S86

The thread #21 activated in step S85 acquires the unused connection structure 151 from the connection pool 113. The thread #21 registers the thread #21 as its own node side thread and the thread #11 as the other node side thread with respect to the acquired connection structure 151. The thread #21 registers the XID acquired from the received message in step S81, in the acquired connection structure 151. Furthermore, the thread #21 registers a pointer to the QP/CQ 111*a* used for communication with the node 100-1 and a pointer to the queuing structure 152 generated in step S83. Therefore, a connection between the thread #11 and the thread #21 is established.

After this, the activated thread #21 executes subsequent processing under the control of the thread scheduler.

Hereinafter, the description continues with reference to FIG. 20.

Step S91

In a case where the connection establishment request flag is "0" in step S82 of FIG. 19, the entry acquired from the CQ is an entry indicating reception completion. The thread #22 determines whether the XID acquired from the received message matches the XID "12" acquired in step S71 of FIG. 18. In a case where XIDs match, the entry obtained from the CQ is an entry addressed to thread #22. In this case, the thread #22 executes processing in step S92. On the other hand, if the XIDs do not match, the entry acquired from the CQ is an entry addressed to any thread other than the thread #22. In this case, the thread #22 executes processing in step S93.

Step S92

The thread #22 executes subsequent processing using the acquired received message.

Step S93

The thread #22 refers to the XID-Qstr correspondence table 112, and specifies the queuing structure 152 corresponding to the XID acquired from the received message.

Step S94

The thread #22 acquires the entry from the message information queue 152*b* of the specified queuing structure 152, and writes the received message into the buffer region indicated by the acquired entry. Furthermore, the thread #22 retrieves an entry from the blocked queue 152*a* of the queuing structure 152, and moves the entry to the ready queue. In a case where the entry acquired from the CQ is addressed to, for example, a thread #23, the thread #23 is wake-up by processing in step S94.

After this, the thread #22 executes processing in step S75 of FIG. 18 and transitions to the suspended state.

Figure 21:
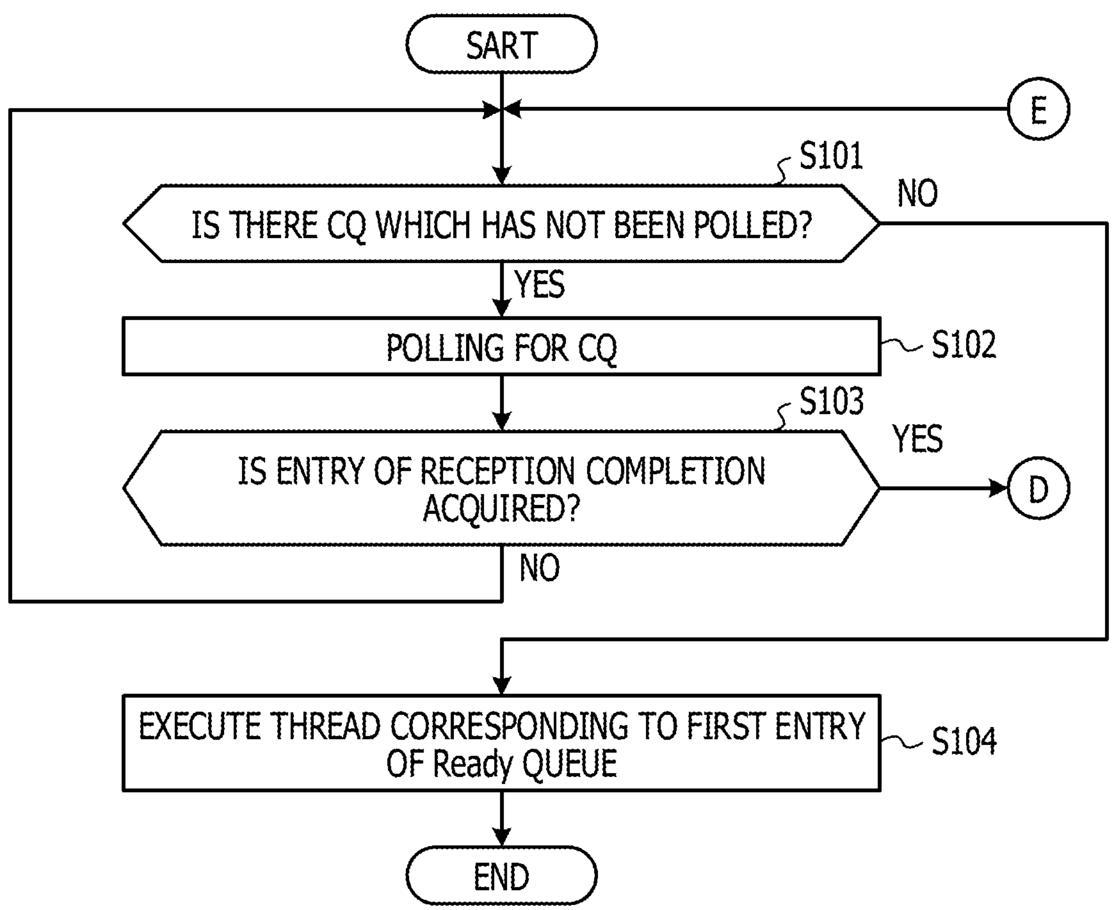
FIG. 21 is a flowchart (part 1) illustrating an example of a processing procedure of a thread scheduler.
Figure 22:
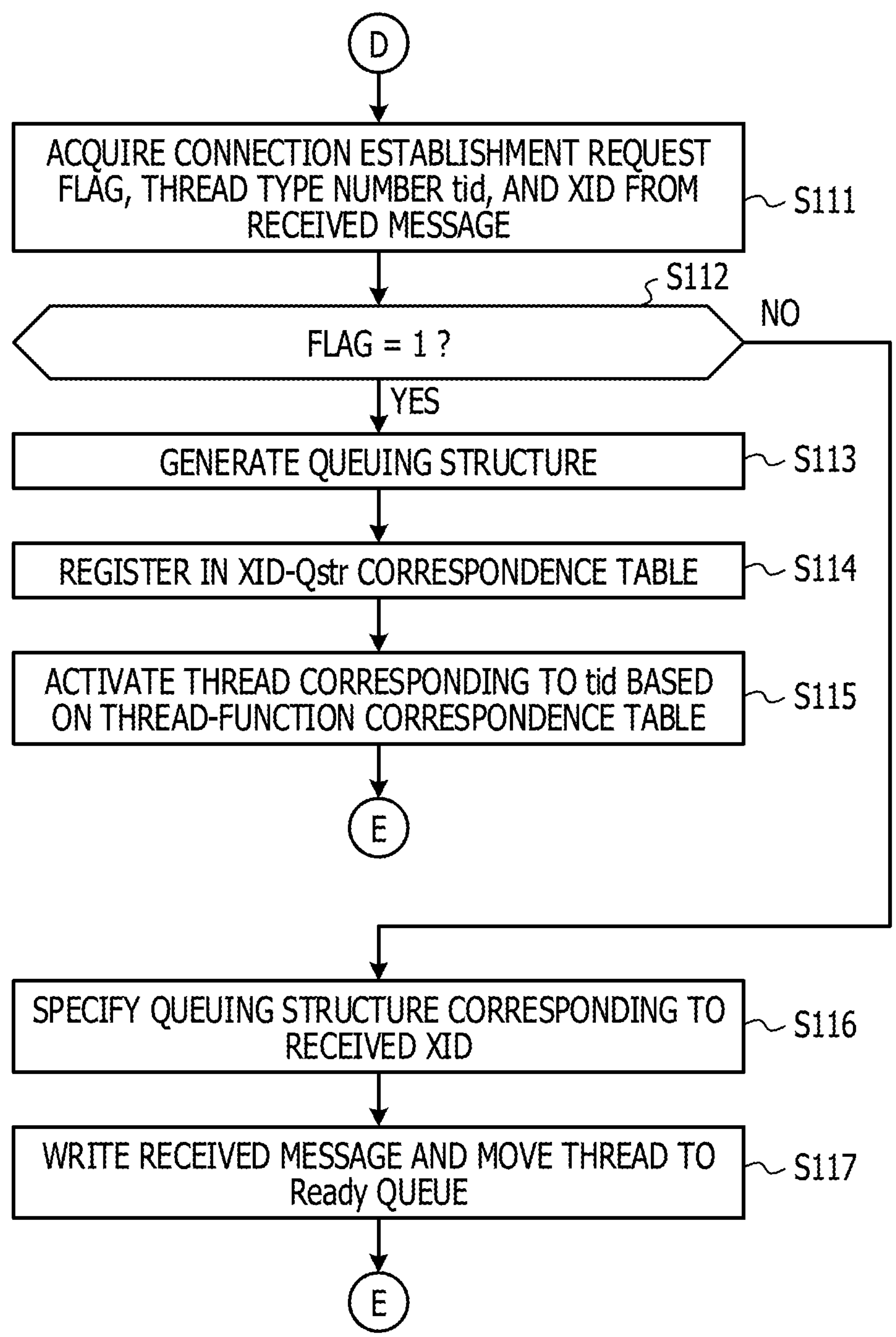
FIG. 22 is a flowchart (part 2) illustrating the example of a processing procedure of a thread scheduler.

FIGS. 21 and 22 are flowcharts illustrating an example of the processing procedure of the thread scheduler. Herein, as an example, the processing of the thread scheduler 131 of the node 100-2 is illustrated. FIGS. 21 and 22 are repeatedly executed.

Step S101

The thread scheduler 131 determines whether there is a CQ which has not been polled among the CQs of the node 100-2. In a case where there is a CQ which is not polled, the thread scheduler 131 executes processing in step S102, and in a case where polling for the entire CQs is completed, the thread scheduler 131 executes processing in step S104.

Step S102

The thread scheduler 131 performs polling for the CQs which are not polled.

Step S103

The thread scheduler 131 determines whether an entry indicating reception completion may be acquired from the CQ as a result of polling. In a case where the entry may be acquired, the thread scheduler 131 executes processing in step S111 of FIG. 22, and in a case where the entry may not be acquired, the thread scheduler 131 executes processing in step S101.

Step S104

The thread scheduler 131 acquires a first entry from the ready queue 115*a* and starts execution of a thread corresponding to the entry.

Hereinafter, the description continues with reference to FIG. 22.

Step S111

The thread scheduler 131 acquires the received message corresponding to the entry acquired in step S103 of FIG. 21, from the receive buffer in which the message received by the HCA driver 140 is stored. The thread scheduler 131 acquires the connection establishment request flag, the thread type number tid, and the XID from the received message.

Step S112

In a case where the connection establishment request flag is "1", the thread scheduler 131 executes processing in step S113, and in a case where the connection establishment request flag is "0", the thread scheduler 131 executes processing in step S116.

Step S113

In a case where the connection establishment request flag is "1", it is requested to newly establish a connection between threads. Herein, as an example, it is described that establishment of a connection between thread #11 and thread #21 is requested by processing of FIG. 16. In this case, the received message includes the XID "11".

Firstly, the thread scheduler 131 newly generates the queuing structure 152.

Step S114

The thread scheduler 131 newly registers a record including the XID "11" acquired from the received message and a pointer indicating the queuing structure 152 generated in step S113, in the XID-Qstr correspondence table 112.

Step S115

The thread scheduler 131 refers to the thread-function correspondence table 114, and specifies the thread #21 associated with the thread type number tid acquired from the received message. The thread scheduler 131 activates the specified thread #21. Hereinafter, the thread scheduler 131 executes processing in step S101 of FIG. 21.

Step S116

The thread scheduler 131 refers to the XID-Qstr correspondence table 112, and specifies the queuing structure 152 corresponding to the XID acquired from the received message.

Step S117

The thread scheduler 131 acquires an entry from the message information queue 152*b* of the specified queuing structure 152, and writes the received message into the buffer region indicated by the acquired entry. Furthermore, the thread scheduler 131 retrieves the entry from the blocked queue 152*a* of the queuing structure 152 and moves the entry to the ready queue. In a case where the entry acquired from the CQ is, for example, addressed to the thread #23, the thread #23 is wake-up by processing in step S117.

Hereinafter, the thread scheduler 131 executes processing in step S101 of FIG. 21.

Specific Example of Thread

Next, a specific processing example of the thread is described.

Figure 23:
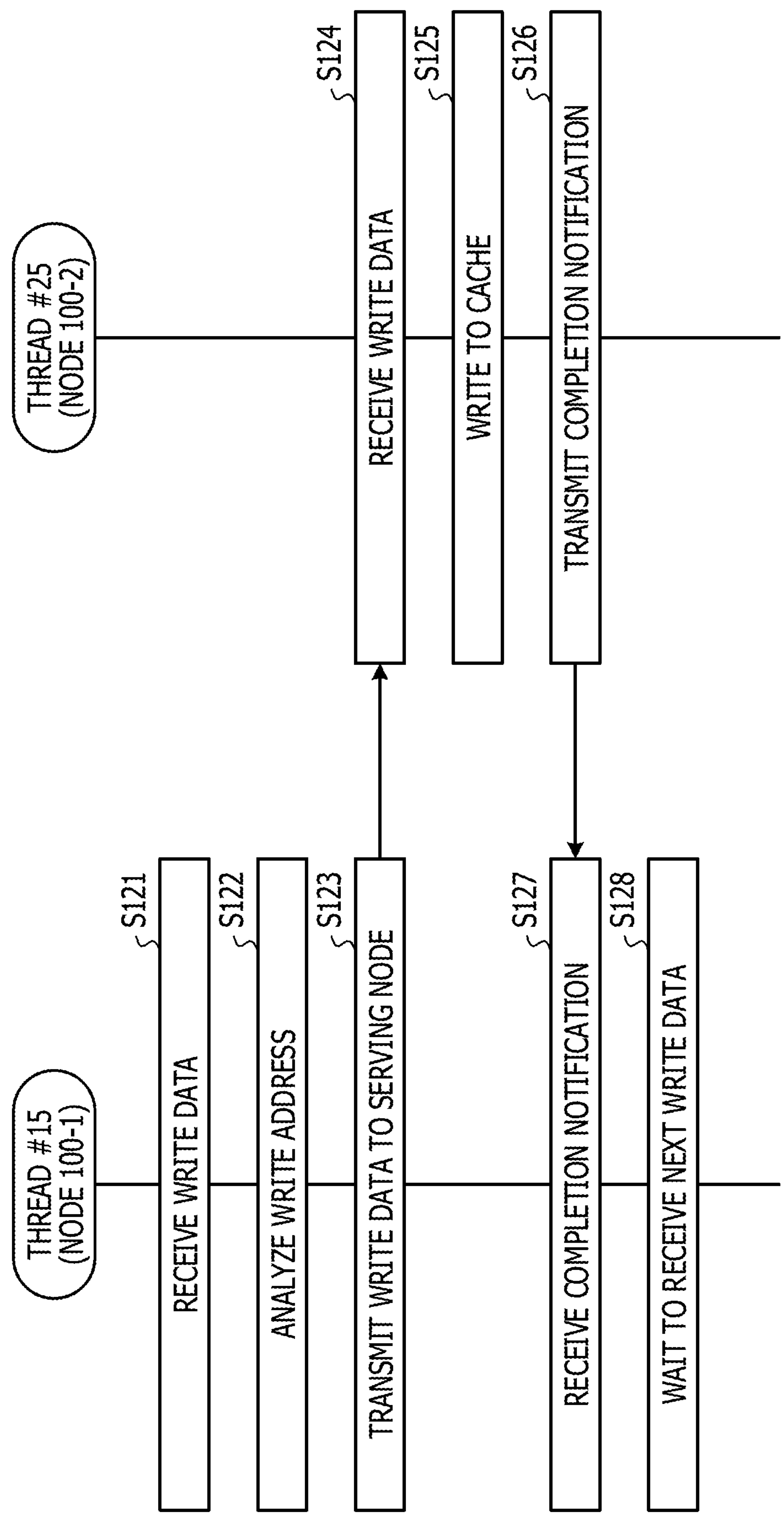
FIG. 23 is a diagram illustrating a processing example of a thread.

FIG. 23 is a diagram illustrating a processing example of a thread. In the example of FIG. 23, it is considered that a connection has been established between the thread #15 of the node 100-1 and the thread #25 of the node 100-2. The thread #15 is a thread that accepts a write request from the host apparatus, and the thread #25 is a thread in the "serving node", which is in charge of storing write data, that accepts write data transferred from another node.

Step S121

The thread #15 receives the write request and the write data from the host apparatus.

Step S122

The thread #15 analyzes the write address and determines the node 100-2 as the serving node.

Step S123

The thread #15 transmits the write data to the node 100-2 which is a serving node.

Step S124

The thread #25 receives the write data.

Step S125

The thread #25 writes the received write data to the cache.

Step S126

The thread #25 transmits completion notification of writing to the node 100-1.

Step S127

The thread #15 receives the completion notification and notifies the host apparatus that the writing is completed.

Step S128

The thread #15 enters a state of waiting to receive the next write data.

In the above processing, for example, the thread #25 issues a receive function "recv" to receive the write data in step S124, and subsequently polls for the CQ. In a case where the thread #25 has failed to acquire an entry addressed to thread #25 itself by polling, the thread #25 is suspended and enter a state of waiting for reception. Thereafter, in a case where the write data, to which the XID corresponding to the connection between the thread #15 and the thread #25 is added, is received, another thread or the thread scheduler on the node 100-2 acquires an entry addressed to the thread #25 from the CQ by polling. Then, the thread #25 is wake-up, acquires the received write data, and starts execution of processing subsequent to step S125.

Through such processing, in a case where the thread #25 has failed to acquire the write data by polling, the thread #25 is suspended and does not be wake-up until the reception of the write data is completed. Therefore, the number of suspended and wake-up times of the thread #25 is reduced and the occurrence of context switching is suppressed, and as a result, the utilization efficiency of the CPU on the node 100-2 is improved.

On the other hand, for example, after the write data transmission in step S123 is completed, the thread #15 issues a receive function "recv" to receive the completion notification in step S127, and then polls for the CQ. If the thread #15 fails to acquire an entry addressed to itself by polling, the thread #15 is suspended and waits for reception. Thereafter, in a case where a completion notification with XID added corresponding to the connection between the thread #15 and the thread #25 is received, an entry from the CQ to the thread #15 is acquired by polling of another thread or the thread scheduler on the node 100-1. Then, the thread #15 is wake-up, acquires the received completion notification, and starts execution of processing subsequent to step S128.

Through such processing, the thread #15 suspends if it fails to acquire completion notification by polling and does not wake up until reception of the completion notification is completed. Therefore, the number of suspended and wake-up times of the thread #15 is reduced and the occurrence of context switching is suppressed, and as a result, the utilization efficiency of the CPU on the node 100-1 is improved.

The processing functions of the apparatuses (for example, the information processing apparatuses 1 and 2, the nodes 100, and 100-1 to 100-4) illustrated in each of the above embodiments may be implemented by a computer. In that case, there is provided a program describing the processing contents of functions that each apparatus includes, and by executing the program by the computer, the processing functions are implemented on the computer. The program describing the processing contents may be recorded in a computer-readable recording medium. The computer-readable recording medium includes a magnetic storage device, an optical disk, a magneto-optical recording medium, a semiconductor memory, and the like. The magnetic storage device includes a hard disk apparatus (HDD), a flexible disk (FD), a magnetic tape, and the like. The optical disk includes a digital versatile disc (DVD), DVD-RAM, a compact disc-read only memory (CD-ROM), CD-Recordable (R)/Rewritable (RW) and the like. The magneto-optical recording medium includes a magneto-optical disk (MO) and the like.

In the case of distributing the program, for example, there is sold a portable recording medium such as DVD, CD-ROM or the like in which the program is recorded. The program may be stored in the storage device of a server computer, and the program may be transmitted via the network from the server computer to another computer.

The computer that executes the program, for example, stores the program recorded in the portable recording medium or the program transmitted from the server computer in its own storage device. Then, the computer reads the program from its own storage device and executes processing according to the program. The computer may read the program directly from the portable recording medium and execute the processing according to the program. Each time the program is transmitted from a server computer connected via a network, the computer may sequentially execute processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:

a communication interface to communicate with another information processing apparatus; and a processor that executes a process, the process including:

issuing, by using a first thread included in a plurality of threads, a reception request of data from the another information processing apparatus to the communication interface;

determining, by using the first thread, whether a completion notification indicating that received data corresponding to the reception request has been received is stored in a queue that stores data transmitted from the other information processing apparatus;

causing the first thread to transit to a suspended state when the completion notification is not stored;

determining, by using a second thread, whether the completion notification, indicating that received data corresponding to the reception request issued by using the first thread, is stored in the queue when the first thread is in the suspended state; and transferring the received data to the first thread and causing the first thread to return from the suspended state, upon a storing of the completion notification.

2. The information processing apparatus according to claim 1, wherein the processing further comprising:

a memory that stores a first identifier indicating each of the plurality of threads; wherein the received data includes a second identifier indicating a destination thread among the plurality of threads; and wherein the process further comprises:

when another completion notification corresponding to another received data is stored in the queue, obtaining the second identifier included in the another received data;

specifying a thread corresponding to the obtained second identifier included in the another received data based on the first identifier stored in the memory;

transferring the another received data to the specified thread and causing the specified thread to return from the suspended state.

3. The information processing apparatus according to claim 2, wherein the specifying specifies the thread corresponding to the obtained second identifier based on a result of a comparison of the first identifier and the second identifier.

4. The information processing apparatus according to claim 1, further comprising:

a memory; and the causing the first thread to move the suspended state includes storing region information, into the memory, that indicates a memory region referred by the first thread; and the transferring the received data includes:

specifying the memory region based on the region information; and storing the received data to the memory region.

5. An information processing method executed by a computer, the information processing method comprising:

issuing, by using a first thread included in a plurality of threads, a reception request of data from the another information processing apparatus to the communication interface;

determining, by using the first thread, whether a completion notification indicating that received data corresponding to the reception request has been received is stored in a queue that stores data transmitted from the other information processing apparatus;

causing the first thread to transit to a suspended state when the completion notification is not stored;

determining, by using a second thread, whether the completion notification, indicating that received data corresponding to the reception request issued by using the first thread, is stored in the queue when the first thread is in the suspended state; and transferring the received data to the first thread and causing the first thread to return from the suspended state, upon a storing of the completion notification.

6. A non-transitory computer-readable storage medium storing a program that causes a computer to execute a process, the process comprising:

issuing, by using a first thread included in a plurality of threads, a reception request of data from the another information processing apparatus to the communication interface;

determining, by using the first thread, whether a completion notification indicating that received data corresponding to the reception request has been received is stored in a queue that stores data transmitted from the other information processing apparatus;

causing the first thread to transit to a suspended state when the completion notification is not stored;

determining, by using a second thread, whether the completion notification, indicating that received data corresponding to the reception request issued by using the first thread, is stored in the queue when the first thread is in the suspended state; and transferring the received data to the first thread and causing the first thread to return from the suspended state, upon a storing of the completion notification.

* * * * *